(12) United States Patent
Ohno et al.

(10) Patent No.: US 7,396,586 B2
(45) Date of Patent: Jul. 8, 2008

(54) PORE FORMING MATERIAL FOR POROUS BODY, MANUFACTURING METHOD OF PORE FORMING MATERIAL FOR POROUS BODY, MANUFACTURING METHOD OF POROUS BODY, POROUS BODY, AND HONEYCOMB STRUCTURAL BODY

(75) Inventors: Kazushige Ohno, Ibi-gun (JP); Hiroki Sato, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/174,726

(22) Filed: Jul. 6, 2005

(65) Prior Publication Data

US 2006/0154021 A1 Jul. 13, 2006

Related U.S. Application Data

(63) Continuation of application No. PCT/JP2005/000311, filed on Jan. 13, 2005.

(30) Foreign Application Priority Data

Jan. 13, 2004 (JP) .............................. 2004-006152

(51) Int. Cl.
C04B 38/00 (2006.01)
C04B 35/00 (2006.01)
B32B 5/16 (2006.01)
(52) U.S. Cl. ................. 428/327; 428/304.4; 428/313.3; 428/313.5; 428/323; 428/116
(58) Field of Classification Search ............. 428/304.4, 428/306.6, 313.3, 313.5, 313.9, 323, 325, 428/327, 116
See application file for complete search history.

(56) References Cited

U.S. PATENT DOCUMENTS

| 4,613,643 | A | * | 9/1986 | Nakamura et al. .......... 524/426 |
| 5,914,187 | A | | 6/1999 | Naruse et al. |
| 5,930,994 | A | | 8/1999 | Shimato et al. |
| 6,447,564 | B1 | | 9/2002 | Ohno et al. |
| 6,565,630 | B2 | | 5/2003 | Ohno et al. |

(Continued)

FOREIGN PATENT DOCUMENTS

EP 0 736 503 A1 10/1996

(Continued)

OTHER PUBLICATIONS

JP-07223879 Translation.*

(Continued)

*Primary Examiner*—John J. Zimmerman
*Assistant Examiner*—Aaron Austin
(74) *Attorney, Agent, or Firm*—Oblon, Spivak, McClelland, Maier & Neustadt, P.C.

(57) ABSTRACT

The pore forming material for a porous body of the present invention comprises organic polymer particles and inorganic particles. As the embodiment thereof, there may be mentioned one having a structure in which the inorganic particles are contained in the organic polymer particles, and an aggregate body of the organic polymer particles and the inorganic particles. The inorganic particles may be inorganic micro-balloons, and the organic polymer particles may be organic micro-balloons.

19 Claims, 21 Drawing Sheets

U.S. PATENT DOCUMENTS

| | | |
|---|---|---|
| 6,669,751 B1 | 12/2003 | Ohno et al. |
| 6,770,116 B2 | 8/2004 | Kojima |
| 2004/0031264 A1 | 2/2004 | Kojima |
| 2004/0033175 A1 | 2/2004 | Ohno et al. |
| 2004/0033893 A1 | 2/2004 | Tomita et al. |
| 2004/0055265 A1 | 3/2004 | Ohno et al. |
| 2004/0091709 A1 | 5/2004 | Ohmura et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0059877 A1 | 3/2006 | Yoshida |
| 2006/0068159 A1 | 3/2006 | Komori et al. |
| 2006/0154021 A1 | 7/2006 | Ohno et al. |
| 2006/0172113 A1 | 8/2006 | Kunieda |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0068128 A1 | 3/2007 | Oshimi et al. |
| 2007/0169453 A1 | 7/2007 | Hayakawa |
| 2007/0190289 A1 | 8/2007 | Fujita |
| 2007/0190350 A1 | 8/2007 | Ohno et al. |

FOREIGN PATENT DOCUMENTS

| | | |
|---|---|---|
| EP | 1 375 454 A1 | 1/2004 |
| EP | 1 375 525 | 1/2004 |
| EP | 1 398 081 A1 | 3/2004 |
| EP | 1 489 278 A1 | 12/2004 |
| JP | 1-167281 | 6/1989 |
| JP | 3-1090 | 1/1991 |
| JP | 6-56554 | 3/1994 |
| JP | 7-223879 | 8/1995 |
| JP | 8-301672 | 11/1996 |
| JP | 11-171663 | 6/1999 |
| JP | 2002-274947 | 9/2002 |
| JP | 2002-326881 | 11/2002 |
| JP | 2002-356383 | 12/2002 |
| JP | 2003-10617 | 1/2003 |
| JP | 2003-210922 | 7/2003 |
| JP | 2003-236384 | 8/2003 |
| JP | 2003-262118 | 9/2003 |
| JP | 2004-83371 | 3/2004 |
| JP | WO-2004024293 * | 3/2004 |
| WO | WO 02/072671 A2 | 9/2002 |
| WO | WO 02/081406 A1 | 10/2002 |
| WO | WO 02/096827 A1 | 12/2002 |
| WO | WO 03082770 A1 * | 10/2003 |

OTHER PUBLICATIONS

U.S. Appl. No. 11/225,197.
U.S. Appl. No. 10/527,531, filed Mar. 11, 2005, Ogyu et al.
U.S. Appl. No. 11/174,726, filed Jul. 6, 2005, Ohno et al.
U.S. Appl. No. 11/174,483, filed Jul. 6, 2005, Saijo et al.

* cited by examiner

A-A Line cross-sectional view

B-B Line cross-sectional view

PORE FORMING MATERIAL FOR POROUS BODY, MANUFACTURING METHOD OF PORE FORMING MATERIAL FOR POROUS BODY, MANUFACTURING METHOD OF POROUS BODY, POROUS BODY, AND HONEYCOMB STRUCTURAL BODY

CROSS-REFERENCE TO RELATED APPLICATIONS

This application claims benefit of priority to PCT Application PCT/JP2005/000311, filed on Jan. 13, 2005.

The contents of this application are incorporated herein by reference in their entirety.

BACKGROUND OF THE INVENTION

1. Field of the Invention

The present invention relates to a pore forming material for a porous body, a manufacturing method of the pore forming material for a porous body, a manufacturing method of a porous body, a porous body, and a honeycomb structural body.

2. Discussion of the Background

In recent years, particulates, such as soot and the like, contained in exhaust gases that are discharged from internal combustion engines of vehicles, such as buses, trucks and the like, and construction machines and the like, have raised serious problems as those particulates are harmful to the environment and the human body.

In order to solve these problems, there have been proposed various honeycomb structural bodies made of porous ceramics, which serve as filters for collecting particulates in exhaust gases to purify the exhaust gases.

With respect to a method for manufacturing a porous body to be used for honeycomb structural bodies of this type, for example, a method has been proposed in which: polymer particles (pore forming material for a porous body) having a pore forming function are mixed in an aggregate made of ceramics, metal and the like, and the resulting product is formed, dried, degreased and fired so that a porous body is manufactured (for example, see JP-A 2003-10617). In such a manufacturing method, almost all the polymer particles are burned to be removed during the degreasing process so that portions that have been occupied by the polymer particles are allowed to form pores; thus, after the firing process, a porous body having the resulting pores is formed.

Moreover, in the honeycomb structural body made of a porous body, the porosity of the porous body forms a very important factor that determines the performance of a filter, and there have been strong demands for a filter having a great porosity from the viewpoints of an increased supported amount of catalyst, the collecting efficiency of fine particles, the pressure loss and the collecting time.

Therefore, in order to manufacture a porous body having a great porosity by using the above-mentioned method, it is necessary to increase the content of polymer particles. However, in this case, an abrupt heat generating reaction is exerted upon burning the polymer particles in the drying, degreasing and firing processes to cause a portion which locally has high temperatures.

Furthermore, in the case where the polymer particles are formed into porous bodies (with a lower density) in an attempt to reduce the content of the polymer particles, the polymer particles are squashed upon applying a high pressure thereto during the forming process.

The contents of JP-A 2003-10617 are incorporated herein by reference in their entirety.

SUMMARY OF THE INVENTION

A first aspect of the present invention relates to a pore forming material for a porous body comprising organic polymer particles and inorganic particles.

The pore forming agent for a porous body in accordance with the first aspect of the present invention is desirably a material in which inorganic particles are contained in the organic polymer particles or an aggregate body of the organic polymer particles and the inorganic particles.

In the pore forming agent for a porous body, the inorganic particles may be inorganic micro-balloons, and the organic polymer particles may be organic micro-balloons. The inorganic particles may function as a sintering aid for the porous body.

In the porous body, the porosity is desirably set in the range of about 10% to about 70% by volume, and the volume ratio of the organic polymer to the inorganic particles (organic polymer/inorganic particles) is desirably set in the range of about 0.1 to about 250, more desirably about 0.1 to about 10.

Moreover, the pore forming material for a porous body is desirably formed into a spherical shape, with an average particle diameter in the range of about 20 to about 60 μm.

In the pore forming agent for a porous body, the inorganic particles are desirably comprising a material of at least one kind selected from the group consisting of nitride ceramics, carbide ceramics and oxide ceramics, or a metal of at least one kind selected from the group consisting of Si, Fe and Al, or a metal compound. Moreover, among ceramics, an oxide ceramic material is desirably used.

In the pore forming agent for a porous body, the organic polymer particles are desirably a polymer of mixed monomer compositions containing a hydrophilic polymer, a multifunctional monomer and other monomers.

The pore forming material for a porous body in accordance with the first aspect of the present invention comprises an organic polymer and inorganic particles, and since the inorganic particles can function as a reinforcing material of the pore forming material for a porous body, it is allowed to have higher mechanical strength in comparison with a pore forming material for a porous body made of only polymer particles.

Moreover, when a porous body is manufactured by using the above-mentioned pore forming material for a porous body, it is possible to prevent the pore forming material for a porous body from being squashed upon forming, and even when a porous body is manufactured by using a forming method in which a high pressure is applied so as to carry out extrusion forming or the like, the above-mentioned pore forming material for a porous body according to the first aspect of the present invention makes it possible to provide a desired pore forming performance.

Furthermore, upon manufacturing a porous body with a high porosity by using the pore forming material for a porous body, the amount of organic components contained in the pore forming material for a porous body is lowered in comparison with the conventional case using polymer particles. For this reason, it becomes possible to prevent a crack or the like from generating in the formed body due to a thermal stress that is partially applied to the formed body caused by an abrupt burning of the organic components upon degreasing or the like. Therefore, the pore forming material for a porous body in accordance with the first aspect of the present invention is suitably used for manufacturing a porous body with a high porosity.

Since the inorganic particles contained in the pore forming material for a porous body are alumina particles and the like, and upon using the material for manufacturing a porous body made of silicon carbide or the like, the pore forming material for a porous body is allowed to function as a sintering aid together with the pore forming function, so that it is possible to lower the firing temperature or accelerate the sintering process; thus, it becomes possible to manufacture a porous body that is superior in mechanical characteristics.

A second aspect of the present invention relates to a manufacturing method of a pore forming agent for a porous body that comprising the steps of: mixing organic polymer particles and inorganic particles in a solvent; and, then, removing the solvent, thereby obtaining an aggregated body of the organic polymer particles and the inorganic particles.

In the manufacturing method of a pore forming agent for a porous body in accordance with the second aspect of the present invention, the pore forming agent for a porous body in accordance with the present invention can be manufactured by using a relatively simple method, so that the resulting pore forming agent for a porous body provides a material used for manufacturing a porous body having superior mechanical characteristics.

A third aspect of the present invention relates to a manufacturing method of a pore forming material for a porous body that comprising the steps of: forming organic micro-balloons having voids therein by carrying out polymerization in an organic solvent; and, then, mixing the organic micro-balloons and inorganic particles to carry out degassing thereon, thereby injecting the inorganic particles into the voids in the organic micro-balloons.

A fourth aspect of the present invention relates to a manufacturing method of a pore forming material for a porous body that comprising the step of: carrying out polymerization in an organic solvent containing inorganic particles, thereby manufacturing organic polymer particles containing the inorganic particles therein.

In accordance with the manufacturing method of the pore forming agent for a porous body in accordance with the third and fourth aspects of the present invention, a pore forming agent for a porous body in which inorganic particles are contained in organic micro-balloons can be manufactured by using a relatively simple method, so that the resulting pore forming agent for a porous body provides a material used for manufacturing a porous body having superior mechanical characteristics, in the same manner as described above.

A fifth aspect of the present invention relates to a manufacturing method of a porous body that comprising the steps of: preparing a mixture for a material for a formed body containing a pore forming material for a porous body made of an organic polymer and inorganic particles, and skeleton particles; forming a formed body from the mixture; and, then, firing the formed body.

In the manufacturing method of a porous body, the particle diameter of the pore forming material for a porous body is desirably set in the range of about 0.5 to about 10.0 times the particle diameter of the skeleton particles, more desirably about 0.5 to about 5.0 times the particle diameter of the skeleton particles, and the firing temperature is desirably set in the range of about 1000° C. to about 2300° C.

The skeleton particles are desirably made of particles of two kinds or more, which have different average particle diameters, or ceramic particles, and metallic particles or semiconductor particles.

In accordance with the manufacturing method of a porous body of the fifth aspect of the present invention, since the pore forming material for a porous body of the present invention is used, it becomes possible to suitably manufacture a porous body that has pores having a desired size and is superior in mechanical strength, even when the porous body is allowed to have a high porosity.

A sixth aspect of the present invention relates to a porous body comprising skeleton particles and voids formed in the skeleton particles. Herein, an inorganic compound containing an element different from the skeleton particles, or a simple substance made of an element different from the skeleton particles is present at least on inner surface of the voids formed in the skeleton particles.

A seventh aspect of the present invention relates to a porous body comprising skeleton particles and voids formed in the skeleton particles. Herein, a compound containing an element that is the same kind as the skeleton particles, or a simple substance made of an element that is the same kind as the skeleton particles is locally present at least on inner surface of the voids formed in the skeleton particles.

An eighth aspect of the present invention relates to a porous body comprising skeleton particles and voids which are formed in the skeleton particles and the major diameter of said void is larger than the major diameter of the skeleton particle. Herein, an inorganic compound containing an element different from the skeleton particles, or a simple substance made of an element different from the skeleton particles is present at least on inner surface of the voids formed in the skeleton particles.

A ninth aspect of the present invention relates to a porous body comprising skeleton particles and voids which are formed in the skeleton particles and the major diameter of said void is larger than the major diameter of the skeleton particle. Herein, a compound containing an element that is the same kind as the skeleton particles, or a simple substance made of an element that is the same kind as the skeleton particles is located on inner surface of said voids formed in said skeleton particles.

In the sixth to ninth aspects of the present invention, the inorganic compound containing an element different from the skeleton particles, the simple substance made of an element different from the skeleton particles, the compound containing an element that is the same kind as the skeleton particles, or the simple substance made of an element that is the same kind as the skeleton particles is desirably a catalyst.

A tenth aspect of the present invention relates to a porous body manufactured by: preparing a mixture for a material for a formed body containing a pore forming material for a porous body made of an organic polymer and inorganic particles, and skeleton particles; forming a formed body from the mixture; and, then, firing the formed body.

In the sixth to tenth aspects of the present invention, the porous body desirably has a porosity in the range of about 45% to about 85%, more desirably about 50% to about 70%, and the skeleton particles are desirably made of silicon carbide particles, and the inorganic compound is desirably comprising at least one kind of material selected from the group consisting of alumina, mullite, silica, titania and silica alumina, or a compound containing Al, Si, Ti or B.

In the sixth to tenth aspects of the present invention, desirably, an inorganic compound containing an element different from the skeleton particles or a simple substance made of an element different from the skeleton particles is present at a neck portion of the skeleton particles; more desirably, an inorganic compound containing an element that is different from the skeleton particles and deposited from a liquid phase or a simple substance made of an element different from the skeleton particles is present at a neck portion of the skeleton particles; and desirably, a compound containing an element that is the same kind as the skeleton particles or a simple substance made of an element that is the same kind as the skeleton particles is present at a neck portion of the skeleton particles.

The porous body in accordance with the sixth to tenth embodiments of the present invention is provided with pores having a large diameter, and in this structure, an inorganic compound containing an element different from the skeleton particles, a simple substance made of an element different from the skeleton particles, a compound containing an element that is the same kind as the skeleton particles, or a simple substance made of an element that is the same kind as the skeleton particles is present on inner surface of the voids (pore) formed in the skeleton particles; therefore, the porous body is suitably used for a honeycomb structural body and the like. The reason for this will be described later in detail.

An eleventh aspect of the present invention relates to a honeycomb structural body that comprises porous bodies each comprising skeleton particles and voids formed in the skeleton particles. Herein, an inorganic compound containing an element different from the skeleton particles, or a simple substance made of an element different from the skeleton particles is present at least on inner surface of the voids formed in the skeleton particles.

A twelfth aspect of the present invention relates to a honeycomb structural body that comprises porous bodies each comprising skeleton particles and voids formed in the skeleton particles. Herein, a compound containing an element that is the same kind as the skeleton particles, or a simple substance made of an element that is the same kind as the skeleton particles is locally present at least on inner surface of the voids formed in the skeleton particles.

A thirteenth aspect of the present invention relates to a honeycomb structural body that comprises porous bodies each comprising skeleton particles and voids which are formed in the skeleton particles and the major diameter of said void is larger than the major diameter of the skeleton particle. Herein, an inorganic compound containing an element different from the skeleton particles, or a simple substance made of an element different from the skeleton particles is present at least on inner surface of the voids formed in the skeleton particles.

A fourteenth aspect of the present invention relates to a honeycomb structural body that comprises porous bodies each comprising skeleton particles and voids which are formed in the skeleton particles and the major diameter of said void is larger than the major diameter of the skeleton particle. Herein, a compound containing an element that is the same kind as the skeleton particles, or a simple substance made of an element that is the same kind as the skeleton particles is locally present at least on inner surface of the voids formed in the skeleton particles.

In the eleventh to fourteenth aspects of the present invention, the porous body has a porosity in the range of about 45% to about 85%, more desirably about 50% to about 70%.

Moreover, the skeleton particles are desirably made of silicon carbide particles, and the inorganic compound is desirably comprising at least one kind of material selected from the group consisting of alumina, mullite, silica, titania and silica alumina, or a compound containing Al, Si, Ti or B.

Here, desirably, an inorganic compound containing an element different from the skeleton particles or a simple substance made of an element different from the skeleton particles is present at a neck portion of the skeleton particles; more desirably, an inorganic compound containing an element that is different from the skeleton particles and deposited from a liquid phase or a simple substance made of an element different from the skeleton particles is present at a neck portion of the skeleton particles; and desirably, a compound containing an element that is the same kind as the skeleton particles or a simple substance made of an element that is the same kind as the skeleton particles is present at a neck portion of the skeleton particles.

Moreover, the inorganic compound containing an element different from the skeleton particles, the simple substance made of an element different from the skeleton particles, the compound containing an element that is the same kind as the skeleton particles, or the simple substance made of an element different from the skeleton particles is desirably a catalyst.

The honeycomb structural body in accordance with the eleventh to fourteenth aspects of the present invention is manufactured by using the porous body of the present invention; therefore, it becomes possible to provide a honeycomb structural body which has pores the diameter of which is controlled in a certain degree, and even in the case of a high porosity, it becomes possible to provide a honeycomb structural body which is free from cracks or the like, and has high strength and superior reliability.

A fifteenth aspect of the present invention relates to a honeycomb structural body that comprises porous bodies each of which is manufactured by: preparing a mixture for a material for a formed body containing a pore forming material for a porous body made of an organic polymer and inorganic particles, and skeleton particles; forming a formed body from the mixture; and, then, firing the formed body.

DESCRIPTION OF THE EMBODIMENTS

The pore forming material for a porous body of the present invention comprises organic polymer particles and inorganic particles.

The pore forming material for a porous body is desirably an aggregate body of the organic polymer particles and the inorganic particles, or has a structure in which the inorganic particles are contained in the organic polymer particles.

First, description will be given of a case where the pore forming agent for a porous body of the present invention is an aggregated body of the organic polymer particles and the inorganic particles.

FIGS. 1A to 1F, FIGS. 2A to 2F and FIGS. 3A to 3C are cross-sectional views each of which shows a specific example in which the pore forming agent for a porous body of the present invention is an aggregated body of the organic polymer particles and the inorganic particles.

Figure 1A:
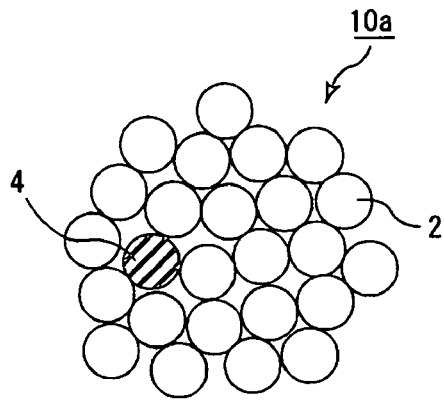
FIGS. 1A to 1F are cross-sectional views each of which schematically shows one example of a pore forming material for a porous body of the present invention.
Figure 1D:
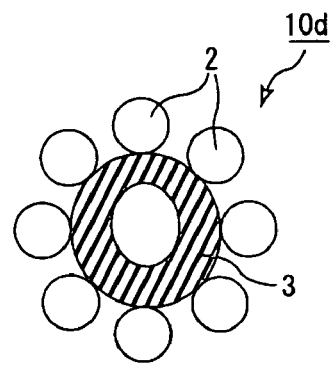
Figure 1B:
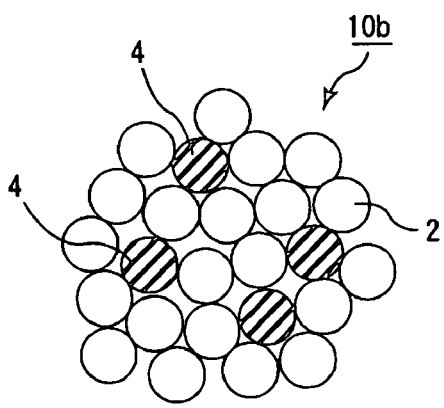
Figure 1E:
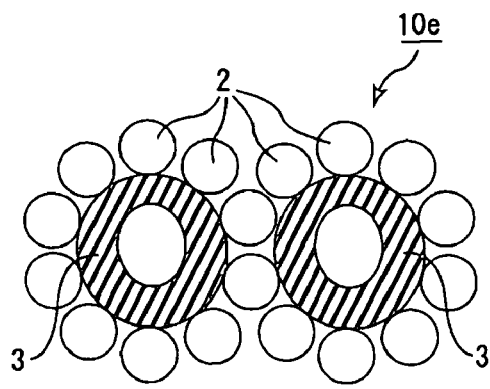
Figure 1C:
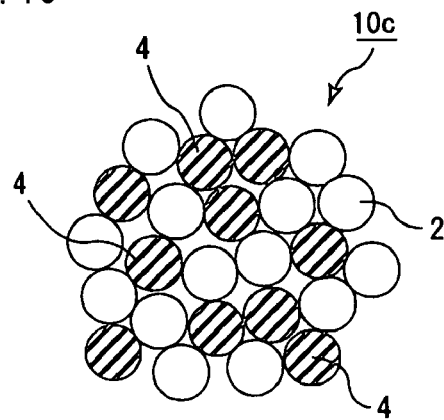

In the pore forming agent 10a for a porous body shown in FIG. 1A, a plurality of organic polymer particles 2 and one inorganic particle 4 are aggregated with each other to form a porous aggregated body, and in FIGS. 1B and 1C also, similar aggregated bodies 10b and 10c are formed; however, the number of the organic particles 4 is increased in the order of 1B and 1C. With respect to the pore forming agents 10a, 10b and 10c for a porous body shown in FIGS. 1A, 1B and 1C, the inorganic particles 4 and the organic polymer particles 2, which have approximately no hollows (voids) inside thereof, are used.

In pore forming agents 10d, 10e and 10f for a porous body shown in FIGS. 1D, 1E and 1F, inorganic particles having hollows therein (hereinafter, referred to as inorganic micro-balloons) 3 are used; the pore forming agent 10d for a porous body shown in FIG. 1D has a structure in which relatively smaller organic polymer particles 2 are aggregated on the periphery of a relatively large inorganic micro-balloon 3; the pore forming agent 10e for a porous body shown in FIG. 1E has a structure in which two pairs of those particles having the structure shown in FIG. 1D are combined to form an aggregated body; and the pore forming agent 10f for a porous body shown in FIG. 1F has a structure in which almost all the periphery of the inorganic micro-balloon 3 is covered with the inorganic polymer particles 2. When these organic polymer particles 2 are completely combined with one another on the periphery of the inorganic micro-balloon 3 to form a structure regarded as one particle, this structure is defined as the following inorganic micro-balloon 5.

In the present specification, the inorganic particle is used as a concept including the inorganic micro-balloon; however, when the inorganic particle is explained in parallel with the inorganic micro-balloon, it is referred to as an inorganic particle having no hollow formed therein.

Figure 2A:
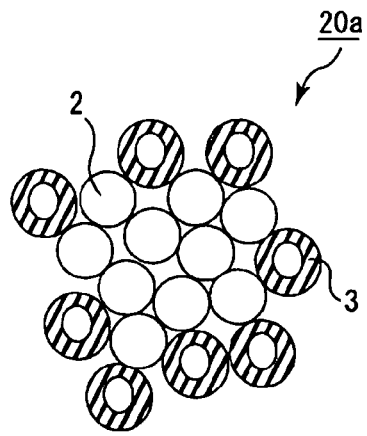
FIGS. 2A to 2F are cross-sectional views each of which schematically shows another example of the pore forming material for a porous body of the present invention.
Figure 2D:
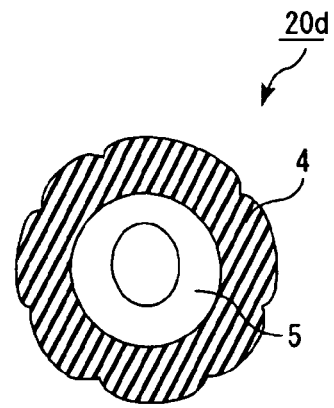
Figure 2B:
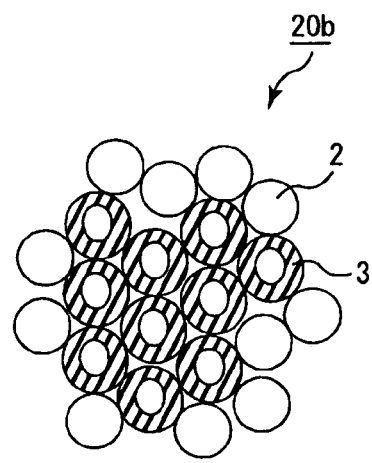

FIGS. 2A and 2B show pore forming agents 20a and 20b for a porous body in which inorganic micro-balloons 3 are used, and the pore forming agent 20a for a porous body shown in FIG. 2A has a structure in which inorganic particles composed of inorganic micro-balloons 3 are adhered to the periphery of an aggregated body of organic polymer particles 2, and the pore forming agent 20b for a porous body shown in FIG. 2B has a structure in which organic polymer particles 2 are adhered to the periphery of an aggregated body constituted by inorganic micro-balloons 3.

Figure 2E:
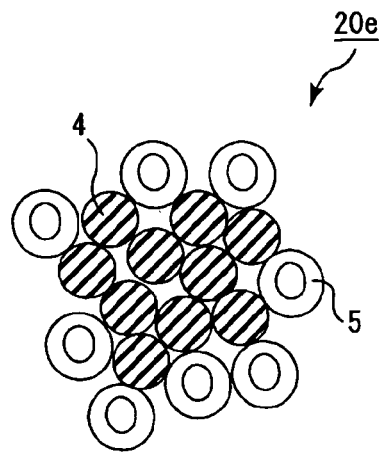
Figure 2C:
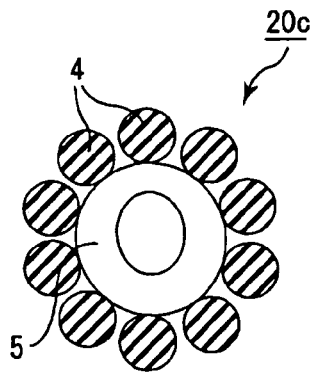

FIGS. 2C to 2F show pore forming agents 20c to 20f for a porous body in which organic polymer particles having hollows therein (hereinafter, referred to also as organic micro-balloons) 5 are used, and the pore forming agent 20c for a porous body shown in FIG. 2C has a structure in which inorganic particles 4 are adhered to the periphery of an organic micro-balloon 5, and the pore forming agent 20d for a porous body shown in FIG. 2D has a structure in which almost all the periphery of an organic micro-balloon 5 is covered with inorganic particles 4.

In the present specification, the organic polymer particle is used as a concept including the organic micro-balloon; however, when the organic polymer particle is explained in parallel with the organic micro-balloon, it is referred to as an organic particle having no hollow formed therein.

Figure 2F:
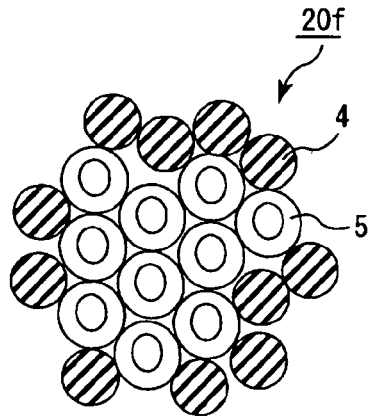

A pore forming agent 20e for a porous body shown in FIG. 2E has a structure in which the organic micro-balloons 5 are adhered to the periphery of an aggregated body of inorganic particles 4, and a pore forming agent 20d for a porous body shown in FIG. 2F has a structure in which the inorganic particles 4 are adhered to the periphery of an aggregated body of the organic micro-balloons 5.

Figure 3A:
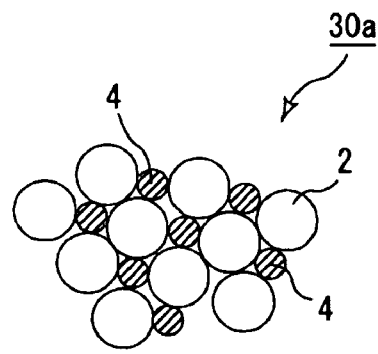
FIGS. 3A to 3C are cross-sectional views each of which schematically shows still another example of the pore forming material for a porous body of the present invention.
Figure 3B:
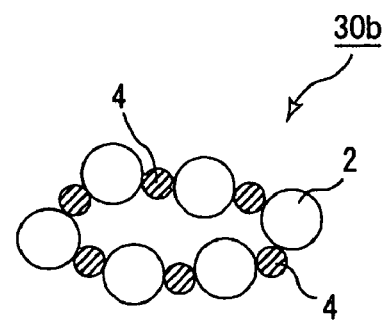

A pore forming agent 30a for a porous body shown in FIG. 3A has a structure in which relatively large organic polymer particles 2 and relatively small inorganic particles 4 are combined with one another, and the inorganic particles 4 are placed in a manner so as to bury a space at which the relatively large organic polymer particles 2 are adhered to each other, and a pore forming agent 30b for a porous body shown in FIG. 3B has a structure in which organic polymer particles 2 and inorganic particles 4 are adhered to one another to form an aggregated body having a hollow therein.

Figure 3C:
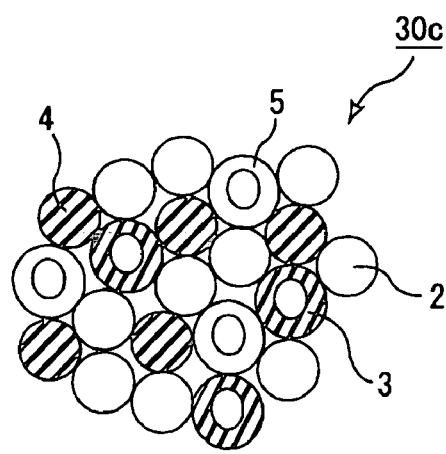

Moreover, a pore forming agent 30c for a porous body shown in FIG. 3C has a structure in which organic polymer particles 2, inorganic micro-balloons 3, inorganic particles 4 and organic micro-balloons 5 are combined with one another in a mixed manner.

As explained with reference to FIGS. 1 to 3, the rate between the organic polymer particles 2 and/or the organic micro-balloons 5 and the inorganic particles 4 and/or the inorganic micro-balloons 3 in the pore forming agent for a porous body is not particularly limited, and can be desirably varied depending on characteristics required for a porous body to be manufactured.

By using each of these pore forming agents 10a to 10f, 20a to 20f and 30a to 30c (hereinafter, also described as 10a to 30c) for a porous body, the formed body containing the pore forming agent for a porous body is degreased and fired to manufacture a porous body; thus, voids (pores) are formed at portions that have been occupied by each of the pore forming agents 10a to 30c for a porous body.

Therefore, by adjusting the content of each of the pore forming agents 10a to 30c for a porous body in the formed body, the porosity of the porous body can be adjusted, and by adjusting the size of each of the pore forming agents 10a to 30c for a porous body, the size of the pores can be adjusted.

The lower limit value of the size of each of the pore forming agents 10a to 30c for a porous body is preferably set to about 20 µm. Moreover, the upper limit value of the size of each of the pore forming agents 10a to 30c for a porous body is preferably set to about 60 µm, more preferably about 40 µm.

Here, since the inorganic particles 4 and the inorganic micro-balloons 3 are contained in the pore forming agents 10a to 30c for a porous body, a porous body in which the inorganic particles 4, the inorganic micro-balloons 3 and inorganic components and inorganic compounds generated by the inorganic micro-balloons 3 are adhered to the inside of each void (pore) in the porous body can be manufactured. When the rate of the inorganic particles 4 and the inorganic micro-balloons 3 exceeds a predetermined level, the inorganic particles 4 and the inorganic micro-balloons 3 are adhered to a wall face of the void, or form a sintered body having a predetermined shape at one portion in the void to function as a reinforcing body for reinforcing the porous body (fired body); thus, the porous body is improved in its mechanical characteristics.

Moreover, by using the inorganic micro-balloons 3, the mechanical characteristics of the porous body can be improved while the porosity is maintained at a high level; thus, it becomes possible to reduce the thermal capacity of the porous body. Since the organic components can be reduced upon forming the voids, it is possible to reduce the calorific value upon manufacturing the porous body.

In the case where the organic micro-balloons 5 are used, since the absolute amount of organic components is small even when the pore forming material for a porous body is blended in the formed body at a high content (volume rate), it is possible to reduce the possibility of a thermal shock locally occurring due to abrupt decomposing and burning of the organic components upon firing (in particular, upon degreasing so as to remove the organic components). For this reason, it becomes possible to make the formed body (sintered body) less likely to generate cracking.

Moreover, a sintering aid may be used as the inorganic particles 4 and the inorganic micro-balloons 3, and this arrangement allows the pore forming material for a porous body to exert not only a pore forming function, but also functions as the sintering aid, to lower the firing temperature or to accelerate the firing process; thus, it becomes possible to manufacture a porous body that is superior in mechanical characteristics.

Furthermore, since each of the pore forming agents 10a to 30c for a porous body have high mechanical strength, the pore forming agent for a porous body is less likely to generate damage (or large deformation) even when a high pressure needs to be applied thereto so as to maintain a predetermined shape upon carrying out shape-formation processes, such as an extrusion-forming process, a press-forming process and the like, so that the shape of the pore forming agent in the formed body can be maintained. As described above, even when a large amount of each of pore forming agents 10a to 30c for a porous body having relatively high strength is added, a formed body having a predetermined shape can be formed; therefore, each of the pore forming agent 10a to 30c of a porous body is suitable for manufacturing a porous body having a porosity of about 45% or more, in particular, a higher porosity of about 50% or more.

Next, description will be given of a case where a material composed of organic polymer particles containing inorganic particles is used as the pore forming agent for a porous body of the present invention.

Figure 4A:
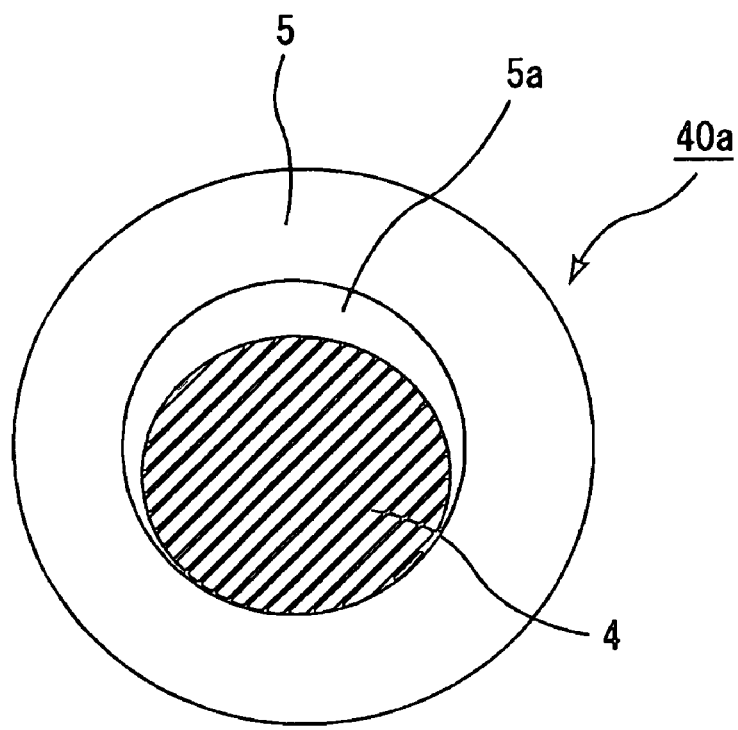
FIGS. 4A and 4B are cross-sectional views each of which schematically shows yet another example of the pore forming material for a porous body of the present invention.
Figure 4B:
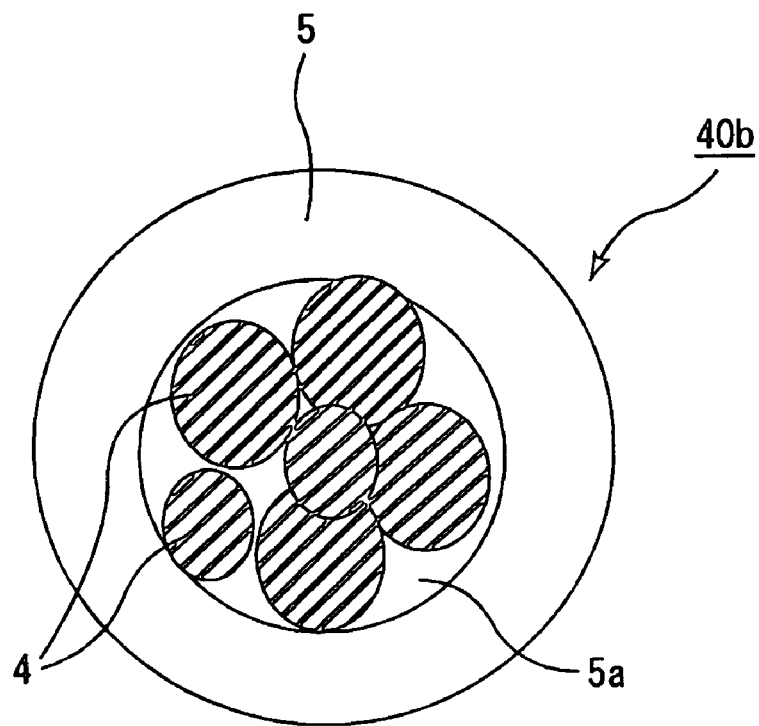
Figure 5A:
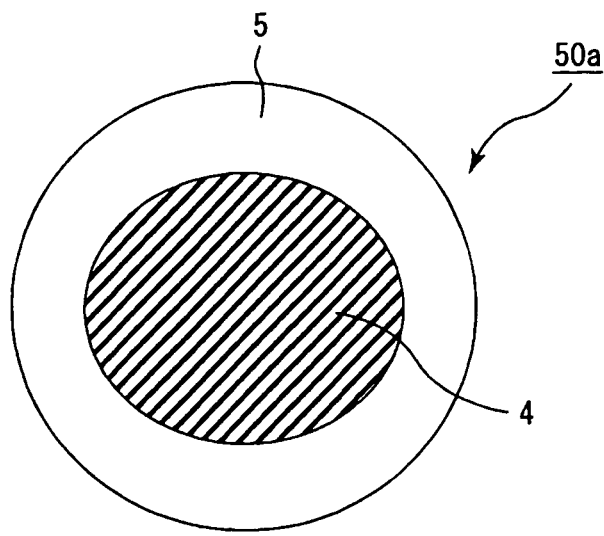
FIGS. 5A to 5C are cross-sectional views each of which schematically shows yet another example of the pore forming material for a porous body of the present invention.
Figure 5B:
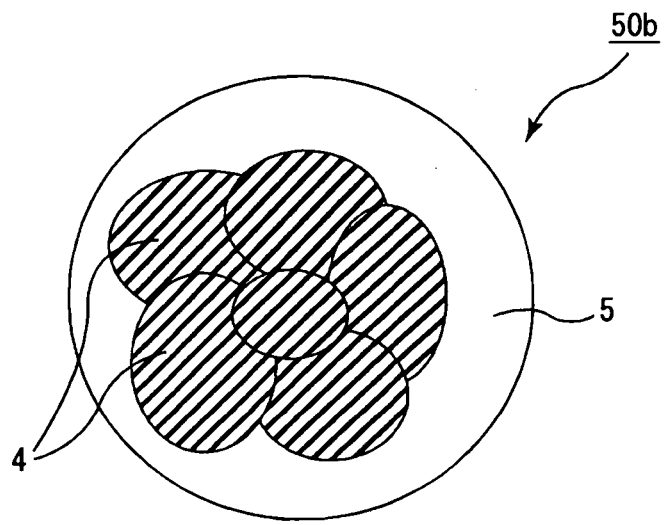
Figure 5C:
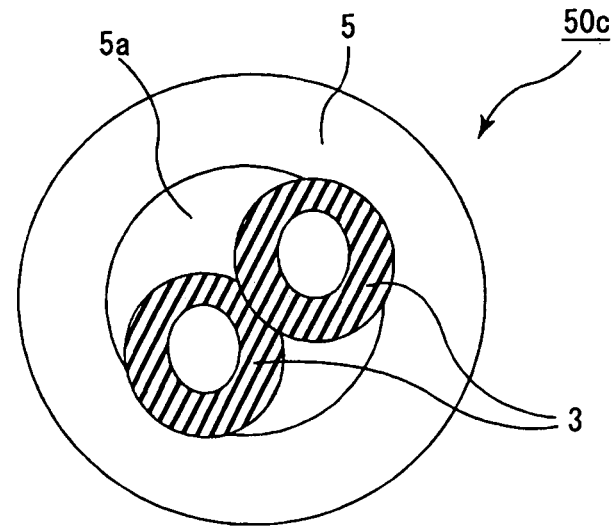

FIGS. 4A and 4B as well as FIGS. 5A to 5C are explanatory views that show specific examples in which the material composed of organic polymer particles containing inorganic particles is used as the pore forming agent for a porous body of the present invention.

In pore forming agents 40a and 40b for a porous body, shown in FIGS. 4A and 4B, one or a plurality of inorganic particles 4 are contained in an organic micro-balloon 5. Moreover, in each of pore forming agent 40a for a porous body shown in FIG. 4A and pore forming agent 40b for a porous body shown in FIG. 4B, the inner space is not completely filled with inorganic particles 4 so that voids 5a still remain inside the organic micro-balloon 5.

In contrast, in pore forming agents 50a and 50b for a porous body, shown in FIGS. 5A and 5B, no voids remain therein, and the space formed inside the organic micro-balloon 5 is completely filled with one or a plurality of inorganic particles 4, and in a pore forming agent 50c for a porous body shown in FIG. 5C, inorganic micro-balloons 3 are contained in the organic micro-balloon 5, and voids 5a also remain outside the inorganic micro-balloons 3.

As shown in FIGS. 4 and 5, the numbers of the organic particles 4 and the inorganic micro-balloons 3 contained in the organic micro-balloon 5 are not particularly limited, and each of the numbers may be set to one or two or more. Other than the inorganic particles 4, voids may remain in the organic micro-balloon 5, or the micro-balloon 5 may be filled with the inorganic particles 4 and the inorganic micro-balloons 3 so that no voids remain therein.

When such pore forming agents 40a, 40b, 50a, 50b and 50c (hereinafter, also described as 40a to 50c) for a porous body are used to manufacture a porous body through degreasing and firing processes of the formed body containing the pore forming agent for a porous body, pores (voids) are formed in the portions where the pore forming agents 40a to 50c for a porous body have been present.

Therefore, by adjusting the contents of the pore forming agents 40a to 50c for a porous body, the porosity of the porous body can be adjusted, and by adjusting the sizes of the pore forming agents 40a to 50c for a porous body, the size of the pores can be adjusted.

The particle diameter of each of the pore forming agents 40a to 50c for a porous body is not particularly limited, and may be properly selected and set by taking the pore diameter of the porous body to be manufactured into consideration, and the lower limit value is preferably set to about 20 μm, more preferably about 60 μm.

Since the inorganic particles 4 and the inorganic micro-balloons 3 are contained in the pore forming agents 40a to 50c for a porous body, it becomes possible to manufacture a porous body having a structure in which the inorganic particles 4 and the inorganic micro-balloons 3 are adhered to the inside of the pore (void). Here, when the rates of the inorganic particles 4 and the inorganic micro-balloons 3 are greater, the inorganic particles 4 and the inorganic micro-balloons 3 function as reinforcing bodies that reinforce the porous body (fired body) so that the mechanical characteristics of the porous body can be improved.

By using the inorganic micro-balloons 3, it becomes possible to improve the mechanical characteristics of the porous body while maintaining the porosity in a high level, and consequently to reduce the thermal capacity of the porous body. Moreover, since the organic component can be reduced upon forming the voids, it becomes possible to reduce the quantity of heat generated upon manufacturing the porous body.

In the case where the organic micro-balloons 5 are used, since the absolute amount of the organic components is small even when the pore forming material for a porous body is blended at a high content (volume ratio); therefore, this reduces the possibility of occurrence of a local thermal shock due to abrupt decomposition and burning of the organic components upon firing (in particular, upon degreasing so as to eliminate the organic components). Consequently, this arrangement reduces the possibility of cracking in the formed body (fired body).

Moreover, a sintering aid may be used as the inorganic particles 4 so that the pore forming material for a porous body functions not only as a pore forming material, but also as a sintering aid; thus, it becomes possible to reduce the firing temperature or to accelerate the firing process to manufacture a porous body that is superior in mechanical characteristics.

Furthermore, since each of the pore forming agents 40a to 50c for a porous body has high mechanical strength, the pore forming agent for a porous body is less likely to generate damage (or large deformation) even when a high pressure needs to be applied thereto so as to maintain a predetermined shape upon carrying out shape-formation processes, such as an extrusion-forming process, a press-forming process and the like; thus, it becomes possible to maintain the shape of the pore forming agent in the formed body. As described above, even when a large amount of each of the pore forming agents 40a to 50c for a porous body having relatively high strength is added, a formed body having a predetermined shape can be manufactured and a porous body having a predetermined shape can be consequently manufactured; therefore, each of the pore forming agent 40a to 50c for a porous body is suitable for manufacturing a porous body having a porosity of about 45% or more, in particular, a higher porosity of about 50% or more.

Each of pore forming agents for a porous body shown in FIGS. 5A and 5B has no void in the organic micro-balloon 5, and the organic micro-balloon 5 and the inorganic particle 4 are made in close-contact with each other so that the strength of the pore forming agent for a porous body is increased. Moreover, it becomes possible to prevent the occurrence of a local thermal shock due to abrupt decomposition and burning of the organic components.

With respect to the inorganic micro-balloons 3, examples thereof may include alumina balloons, glass micro-balloons, shirasu balloons, fly ash balloons (FA balloons), mullite balloons and the like. Among these, alumina balloons are more desirably used. Here, the term, "balloons", is used as a concept including, so-called bubbles and hollow spheres, and refers to hollow particles containing pores inside thereof.

Since the inorganic micro-balloons 3 have voids therein, the inorganic micro-balloons function as a pore forming agent even when used alone; however, the application of the inorganic micro-balloons 3 makes it possible to reduce the amount of the organic polymer particles. Moreover, the application of the inorganic micro-balloons to the pore forming agent for a porous body makes it possible to adjust the blend amount of the inorganic particles.

In the following, description will be given of a structure (characteristics) that is commonly possessed by both of pore forming agents 10a to 30c for a porous body made of aggregated bodies of organic polymer particles and inorganic particles as shown in FIGS. 1 to 3 and pore forming agents 40a to 50c for a porous body in which inorganic particles are contained in organic polymer particles, as shown in FIGS. 4 and 5.

With respect to the pore forming agents 10a to 50c for a porous body as shown in FIGS. 1 to 5, examples of the inorganic particles 4 may include particles made of ceramics, and with respect to the particles made of ceramics, examples thereof may include particles made of nitride ceramics such as aluminum nitride, silicon nitride, boron nitride, and titanium nitride, carbide ceramics such as silicon carbide, zirconium carbide, titanium carbide, tantalum carbide, tungsten carbide, and boron carbide ($B_4C$), oxide ceramics such as alumina, zirconia, cordierite, mullite, and silica, and the like. With respect to the inorganic particles 4, examples thereof may include particles made of metal such as Si, Fe, and Al and particles made of a metal compound such as iron oxide.

Among these, from the viewpoint of explosion-protective property upon manufacturing, particles made of ceramics are preferably used, and particles made of oxide ceramics are more preferably used.

With respect to the organic polymer particles 2, examples thereof may include a polymer of a mixed monomer composition including a hydrophilic monomer, a multifunctional monomer and other monomers, and the like.

With respect to the hydrophilic monomer, examples thereof may include methyl(metha)acrylate, (metha)acrylonitrile, (metha)acrylamide, (metha)acrylic acid, glycidyl (metha)acrylate, 2-hydroxyethyl methacrylate, 2-hydroxypropyl methacrylate, vinylpyridine, 2-acryloyloxyethyl phthalic acid, itaconic acid, fumaric acid, dimethylaminomethyl methacrylate and the like, and preferable examples may include methyl methacrylate, (metha) acrylic acid, 2-hydroxyethyl methacrylate and the like.

Each of these may be used alone, or two or more kinds of these may be used in combination.

With respect to the multifunctional monomer, examples thereof may include di(metha)acrylate, tri(metha)acrylate and the like.

Examples of the di(metha)acrylate may include ethyleneglycol di(metha)acrylate, diethyleneglycol di(metha)acrylate, triethyleneglycol di(metha)acrylate, 1,6-hexane diol di(metha)acrylate, trimethylol propane di(metha)acrylate and the like.

Examples of the tri(metha)acrylate may include trimethylolpropane tri(metha)acrylate, ethyleneoxide-modified trimethylolpropane tri (metha) acrylate, pentaerythritol tri (metha)acrylate and the like.

Moreover, examples of the multifunctional monomer may include pentaerythritol tetra(metha)acrylate, dipentaerythritol hexa(metha)acrylate, diallyl or triallyl compounds, such as diallyl phthalate, diallyl maleate, diallyl fumarate, diallyl succinate, triallyl isocyanurateandthe like, divinyl compounds such as divinyl benzene, butadiene and the like, and the like.

Each of these may be used alone, or two or more kinds of these may be used in combination.

Examples of the other monomers may include alkyl (metha)acrylates such as ethyl(metha)acrylate, propyl (metha)acrylate, butyl(metha)acrylate, cumyl(metha)acrylate, cyclohexyl(metha)acrylate, myristyl(metha)acrylate, palmityl(metha)acrylate, and stearyl(metha)acrylate; aromatic vinyl monomers such as styrene, α-methylstyrene, p-methylstyrene, and p-chlorostyrene; vinyl esters such as vinyl acetate and vinyl propionate; halogen-containing monomers such as vinyl chloride and vinylidene chloride; ethylene, propylene, butadiene and the like.

Each of these may be used alone, or two or more kinds of these may be used in combination.

With respect to the organic micro-balloons 5, those materials that are the same as those for the organic polymer particles 2 may be used.

Moreover, the particle diameter thereof is desirably set to about 0.5 to about 10.0 times, more desirably about 0.5 to about 5.0 times the particle diameter of the skeleton particles of the porous body. This arrangement makes it possible to provide proper pore forming effects and consequently to increase the strength of the porous body.

The pore forming agents 10a to 50c for a porous body are desirably designed to have a spherical shape. This arrangement allows the agents to be easily dispersed upon manufacturing the formed body, and makes it possible to suppress the pressure loss to a low level when the porous body is used as a filter for purifying exhaust gases.

The porosity of each of the pore forming materials 10a to 50c for a porous body (the rate of inner voids to the entire volume) is desirably set to a lower limit value of about 10% by volume, and an upper limit value of about 70% by volume.

By setting the porosity within the above-mentioned range, it becomes possible reduce a thermal shock upon firing (upon degreasing), while properly maintaining the mechanical strength of each of the pore forming materials 40a to 50c for a porous body.

The lower limit of the porosity is desirably set to about 20% by volume, and the upper limit of the porosity is desirably set to about 60% by volume.

Here, the porosity of the pore forming materials 10a to 50c for a porous body is found through the following processes: the respective constituent components of the organic polymers and the inorganic particles of the pore forming material are identified through gas chromatography, fluorescent X-ray analyses and the like, and the respective densities are calculated by using a specific gravity bottle or the like; thereafter, the organic components are burned and eliminated so that the volume of the organic polymer is calculated based upon the reduced weight corresponding to the organic components, with the rest of weight being defined as the weight of the inorganic particles; thus, the porosity can be calculated based upon the respective volumes.

Moreover, in each of the pore forming materials 10a to 50c for a porous body, the volume ratio of the organic micro-balloons 5 to the inorganic particles 4 (organic micro-balloons/inorganic particles) desirably has a lower limit value of about 0.1 and an upper limit value of about 250, more desirably an upper limit value of about 10.

By setting the volume ratio within this range, it becomes possible to reduce a thermal shock upon firing (upon degreasing) without degradation in pore forming performance.

Next, description will be given of a manufacturing method of a pore forming agent for a porous body.

First, a manufacturing method of a pore forming agent for a porous body made of an aggregate body of organic polymer particles and inorganic particles is explained.

In the case where the pore forming agent for a porous body made of an aggregate body of organic polymer particles and inorganic particles is manufactured, after organic polymer particles (and/or organic micro-balloons) and inorganic particles (and/or inorganic micro-balloons) have been mixed in a solvent, the solvent is removed so that an aggregate body of the organic polymer particles and the inorganic particles is obtained.

Figure 6:
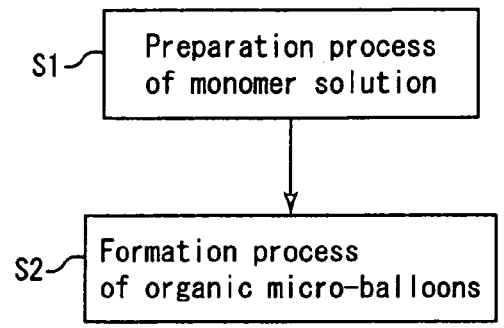
FIG. 6 is a process chart that shows manufacturing processes of organic micro-balloons.
Figure 7A:
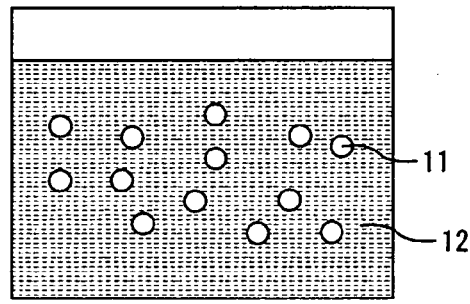
FIGS. 7A to 7C are cross-sectional views that show a manufacturing process of organic micro-balloons.
Figure 7B:
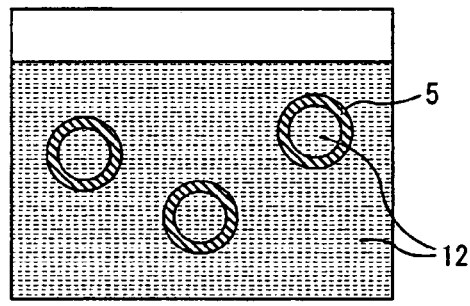
Figure 7C:
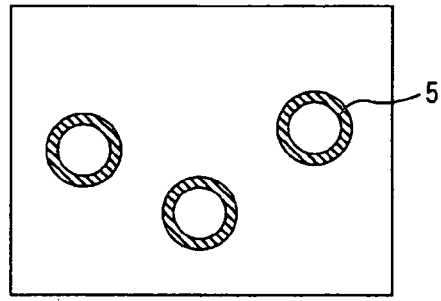

FIG. 6 is a flowchart that shows manufacturing processes of organic micro-balloons, and FIGS. 7A to 7C are cross-sectional views that show the manufacturing processes of organic micro-balloons.

As shown in FIG. 6, the organic micro-balloons 5 are obtained through a monomer solution preparation process (step S1) and an organic micro-balloon formation process (step S2).

More specifically, for example, as shown in FIG. 7A, the mixed monomer 11, made of a hydrophilic monomer, a multifunctional monomer and other monomers, is mixed with a non-polymerizable organic solvent 12 so that the mixed monomer 11 is suspended in the non-polymerizable organic solvent 12 (step S1). Thereafter, as shown in FIG. 7B, the monomer components are polymerized so that organic micro-balloons 5 containing the non-polymerizable organic solvent 5 are obtained (step S2).

Then, as shown in FIG. 7C, the non-polymerizable organic solvent 12 in the organic micro-balloons 5 is removed so that the organic micro-balloons 5 not containing the non-polymerizable organic solvent 12 may be obtained; alternatively, the product obtained in FIG. 7B, as it is, may be used as a material for the pore forming agent for a porous body.

With respect to the method for polymerizing the mixed monomer, although not particularly limited, the suspension polymerizing method is desirably used, since this method easily controls the particle diameter and also easily manufactures particles that include effective voids.

Here, commercially available organic micro-balloons, as they are, may be utilized.

With respect to the inorganic micro-balloons 3, commercial products made of the above-mentioned compounds may be used.

Figure 8:
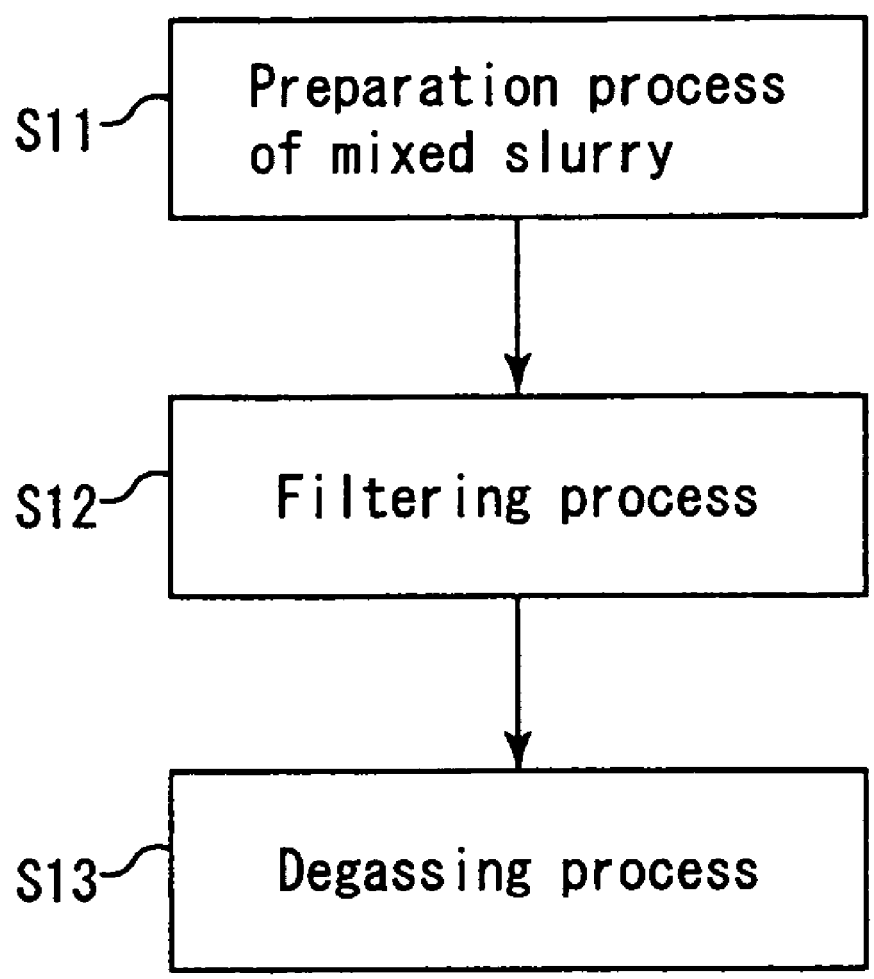
FIG. 8 is a process chart that shows manufacturing processes of a pore forming agent for a porous body according to the present invention.
Figure 9A:
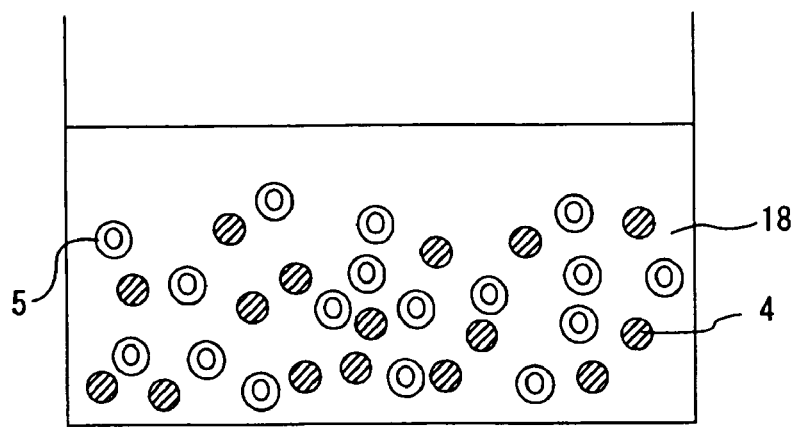
FIGS. 9A to 9C are cross-sectional views that show the manufacturing processes of the pore forming agent for a porous body according to the present invention.
Figure 9B:
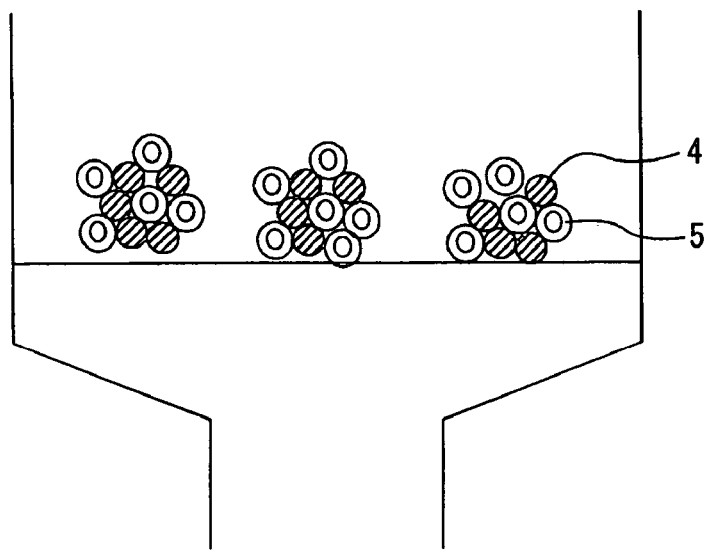
Figure 9C:
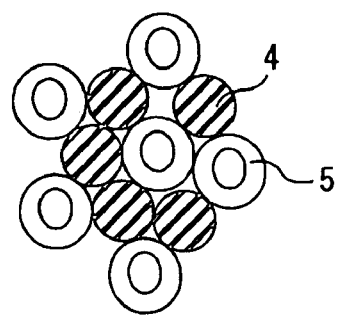

FIG. 8 is a flowchart that shows manufacturing processes of a pore forming agent for a porous body, and FIGS. 9A to 9C are cross-sectional views that show the manufacturing processes of the pore forming agent for a porous body.

As shown in FIG. 8, pore forming agents 10a to 30c for a porous body are obtained through a mixed slurry preparation step (step S11), a filtering process (step S12) and a degassing process (step S13).

For example, as shown in FIG. 9A, a slurry of the organic micro-balloons 5 containing a solvent is mixed with a slurry containing inorganic particles 4 having a predetermined concentration so that a mixed slurry containing the organic micro-balloons 5 and the inorganic particles 4 in the solvent 18 is prepared (step S11).

Next, as shown in FIG. 9B, a mixture of the organic micro-balloons 5 and the inorganic particles 4 is obtained through a filtering processor the like (step S12), and the mixture is immediately subjected to degassing so as to increase the cohesion thereof to prepare a pore forming agent for a porous body (step S13).

In the above-mentioned process, a pore forming agent for a porous body made of an aggregate body of the inorganic micro-balloons 5 and the inorganic particles 4 is obtained; however, organic polymer particles 2 may be used in place of the organic micro-balloons 5, and a mixed material containing the inorganic micro-balloons 5 and the organic polymer particles 2 at a predetermined ratio may also be used. Moreover, inorganic micro-balloons 3 may be used in place of the inorganic particles 4, and a mixed material containing the inorganic particles 4 and the inorganic micro-balloons 3 at a predetermined ratio may also be used.

The particle diameter of the pore forming agent for a porous body can be adjusted by alternating the concentration of slurry, the sizes and kinds of the respective material particles, the kinds of solvents, the temperature upon filtering, and the like. Moreover, the particle diameter can be also changed by repeating the above-mentioned processes.

Upon repeating the above-mentioned processes, the porosity in the pore forming agent for a porous body can be changed by changing the particle diameter of the inorganic particles 4.

When the inorganic particles 4 are contained in the pore forming agent for a porous body, a sol containing very fine inorganic particles, such as an alumina sol, a silica sol and the like, maybe used. Here, in an attempt to adjust the content of the inorganic particles to a higher level, the resulting pore forming agent for a porous body may be put into a solution such as an alumina sol, a silica sol or the like, so that a set of processes including filtering, degassing and drying processes is repeated a plurality of times.

In the case where, as shown in FIGS. 2C and 2D, pore forming agents 20c and 20d for a porous body in which a number of relatively small organic polymer particles 2 are adhered to the periphery of each of relatively large inorganic micro-balloons 3 and pore forming agents for a porous body in which a number of relatively small organic polymer particles 2 are adhered to the periphery of each of relatively large inorganic particles 4 are manufactured, a material, prepared by dissolving a polymer in a solvent, is applied or sprayed onto the inorganic micro-balloons 3 (inorganic particles 4), and the resulting matter is impregnated with a solvent, and then subjected to a chemical process (such as an oxidizing process), or the resulting matter is subjected to a physical process (such as a grinding process and a pulverization process); thus, the target agents can be manufactured.

Moreover, in the case where, as shown in FIGS. 2D to 2F, pore forming agents 10d, 10e and 10f for a porous body in which a number of relatively small inorganic particles 4 are adhered to the periphery of each of relatively large organic micro-balloons 5 and pore forming agents for a porous body in which a number of relatively small inorganic particles 4 are adhered to the periphery of each of relatively large organic polymer particles 2 are manufactured, a material, prepared by dissolving a polymer in a solvent containing inorganic particles, such as an alumina sol, is applied or sprayed onto the organic micro-balloons 5 (organic polymer particles 2), and the resulting matter is impregnated in a solution, and then subjected to a chemical process (such as an oxidizing process), or the resulting matter is subjected to a physical process (such as a grinding process and a pulverization process); thus, the target agents can be manufactured.

Here, by carrying out the above-mentioned methods a plurality of times or in combination with each other, the conditions (particle size, density rates and the like) of the surface inorganic particles and the inner inorganic particles can be altered without the necessity of changing the particle size and the like of the inorganic particles and organic polymer particles in the slurry. Of course, by carrying out the above-mentioned processes a plurality of times or carrying out the above-mentioned methods in combination with one another, with the particle size and the like of the inorganic particles and organic polymer particles in the slurry being changed, the conditions (particle size, density rates and the like) of the surface inorganic particles and the inner inorganic particles can be altered.

Moreover, in order to granulate the inorganic particles 4, a pulverization process may be carried out.

Furthermore, by subjecting the inorganic particles 4 to a chemical process (such as an oxidizing process) and a physical process (such as a grinding process), the weight per one inorganic particle can be reduced so that the ratio between the organic component and the inorganic component can be adjusted; thus, it becomes possible to alter the strength of the pore forming material.

Next, description will be given of a manufacturing method of a pore forming material for a porous body in which inorganic particles are contained in each of organic polymer particles.

In an attempt to obtain a pore forming material for a porous body in which inorganic particles are contained in each of organic polymer particles, two methods are proposed in which inorganic particles are injected into organic micro-balloons and in which inorganic particles are coated with an organic polymer.

First, description will be given of the method using the organic micro-balloons.

Figure 10:
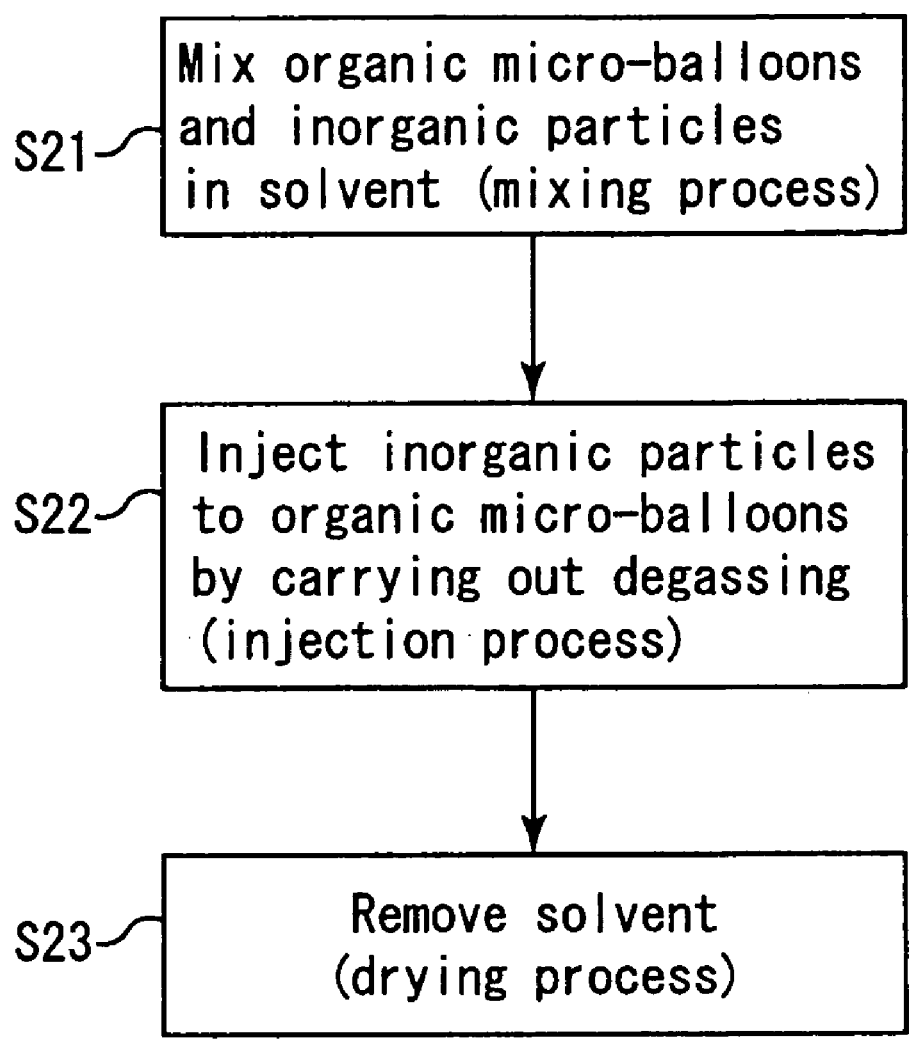
FIG. 10 is a process chart that shows another manufacturing processes of the pore forming agent for a porous body according to the present invention.
Figure 11A:
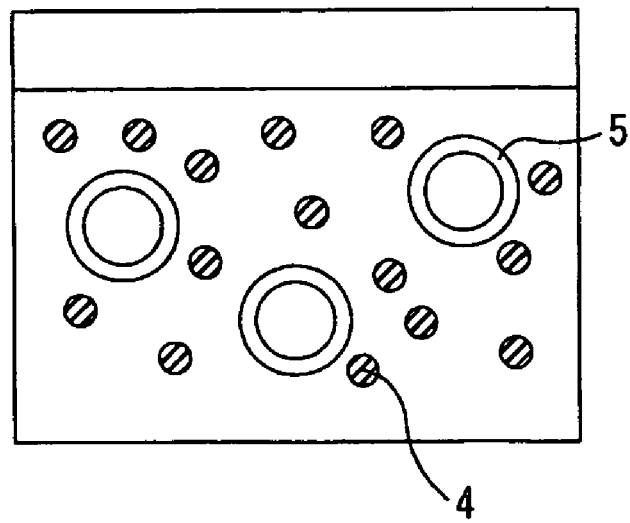
FIGS. 11A to 11C are cross-sectional views that show still another manufacturing processes of the pore forming agent for a porous body according to the present invention.
Figure 11B:
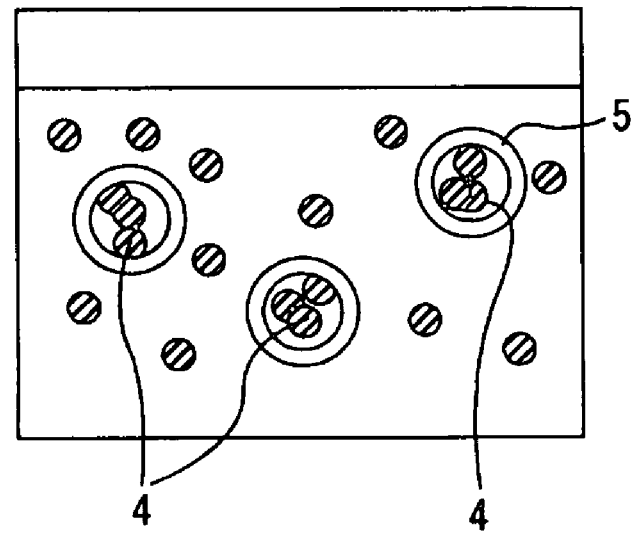
Figure 11C:
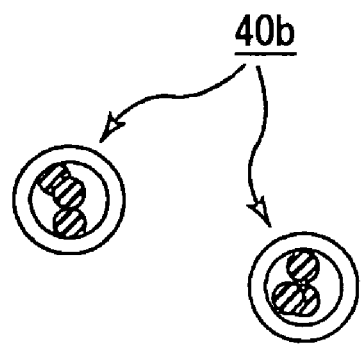

FIG. 10 is a flowchart that shows manufacturing processes of a pore forming agent for a porous body, and FIGS. 11A to 11C are cross-sectional views that show manufacturing processes of the pore forming agent for a porous body.

The organic micro-balloons 5 are manufactured through the aforementioned steps S1 and S2. In this case, desirably, the solvent in the organic micro-balloons is preliminarily removed.

In this method, the organic micro-balloons 5 and the inorganic particles 4 are mixed in a solvent (step S21), and degassed so that the inorganic particles 4 are injected into each of the organic micro-balloons 5 (step S22); thus, the solvent is removed (step S23) so that a pore forming agent for a porous body in which the inorganic particles 4 are contained in the organic micro-balloons 5 is obtained.

More specifically, a pore forming material 40b for a porous body can be manufactured through the following processes: a mixing process (step S21) in which, for example, as shown in FIG. 11A, the organic micro-balloons 5 are put into a slurry 41 containing inorganic particles 4 having a predetermined concentration to be mixed therein, an injection process (step S22) in which, as shown in FIG. 11B, the inorganic particles 4 are injected into each of hollow polymer particles 2 in a degassed state so as to be transferred thereto, and a drying process (step S23) in which, as shown in FIG. 11C, the resulting matter is subjected to solvent-removing and drying.

By using the inorganic micro-balloons 3 as the inorganic particles 4, a pore forming agent 50c for a porous body in which the inorganic micro-balloons 3 are housed in voids of the organic micro-balloons 5, as shown in FIG. 5C, can be obtained.

Here, in place of the inorganic particles 4, a sol containing very fine inorganic particles (components), such as an alumina sol, a silica sol and the like, may be used. Here, in an attempt to adjust the content of the inorganic particles to a higher level, processes in which the organic micro-balloons 5 are put into a slurry containing inorganic particles and in which the inorganic particles 4 are transferred into the organic micro-balloons 5 and the resulting matter is dried are repeated a plurality of times.

In the case where the inorganic particles are coated with an organic polymer, upon manufacturing the organic micro-balloons 5, inorganic particles such as alumina, silica and the like are preliminarily mixed in the above-mentioned mixed monomer, and the mixed monomer is then polymerized by using a conventionally known encapsulating method so that a pore forming material for a porous body in which the inorganic particles 4 are coated with the organic polymer particles 2 (organic polymer) can be manufactured.

Figure 1F:
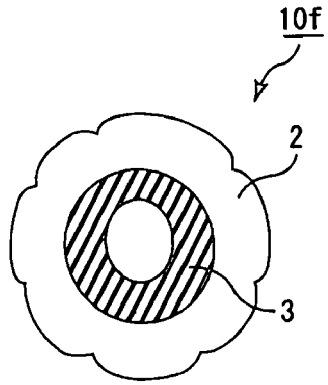

By using the method employed for manufacturing the pore forming agent 10f for a porous body as shown in FIG. 1F, that is, the method including the processes in which a material prepared by dissolving a polymer in a solvent is applied to the inorganic micro-balloons 3 (inorganic particles 4) and the resulting matter is impregnated with a solution, and then subjected to a chemical process (for example, an oxidizing process), or the resulting matter is subjected to a physical process (for example, a grinding process and a pulverization processes), a pore forming material for a porous body in which the inorganic particles 4 are coated with the organic polymer particles 2 (organic polymer) can be also manufactured.

Here, by carrying out the above-mentioned methods a plurality of times or in combination with each other, the states (particle size, density rates and the like) of the surface inorganic particles and the inner inorganic particles can be altered without the necessity of changing the particle size and the like of the inorganic particles and organic polymer particles in the slurry. Of course, by carrying out the above-mentioned processes a plurality of times or carrying out the above-mentioned methods in combination with one another, with the particle size and the like of the inorganic particles and organic polymer particles in the slurry being changed, the states (particle size, density rates and the like) of the surface inorganic particles and the inner inorganic particles can be altered.

Moreover, in order to granulate the inorganic particles 4, a pulverization process may be carried out.

Furthermore, by subjecting the inorganic particles 4 to a chemical process (such as an oxidizing process) and a physical process (such as a grinding process), the weight per one inorganic particle can be reduced so that the ratio between the organic component and the inorganic component can be adjusted; thus, it becomes possible to alter the strength of the pore forming material.

Figure 12:
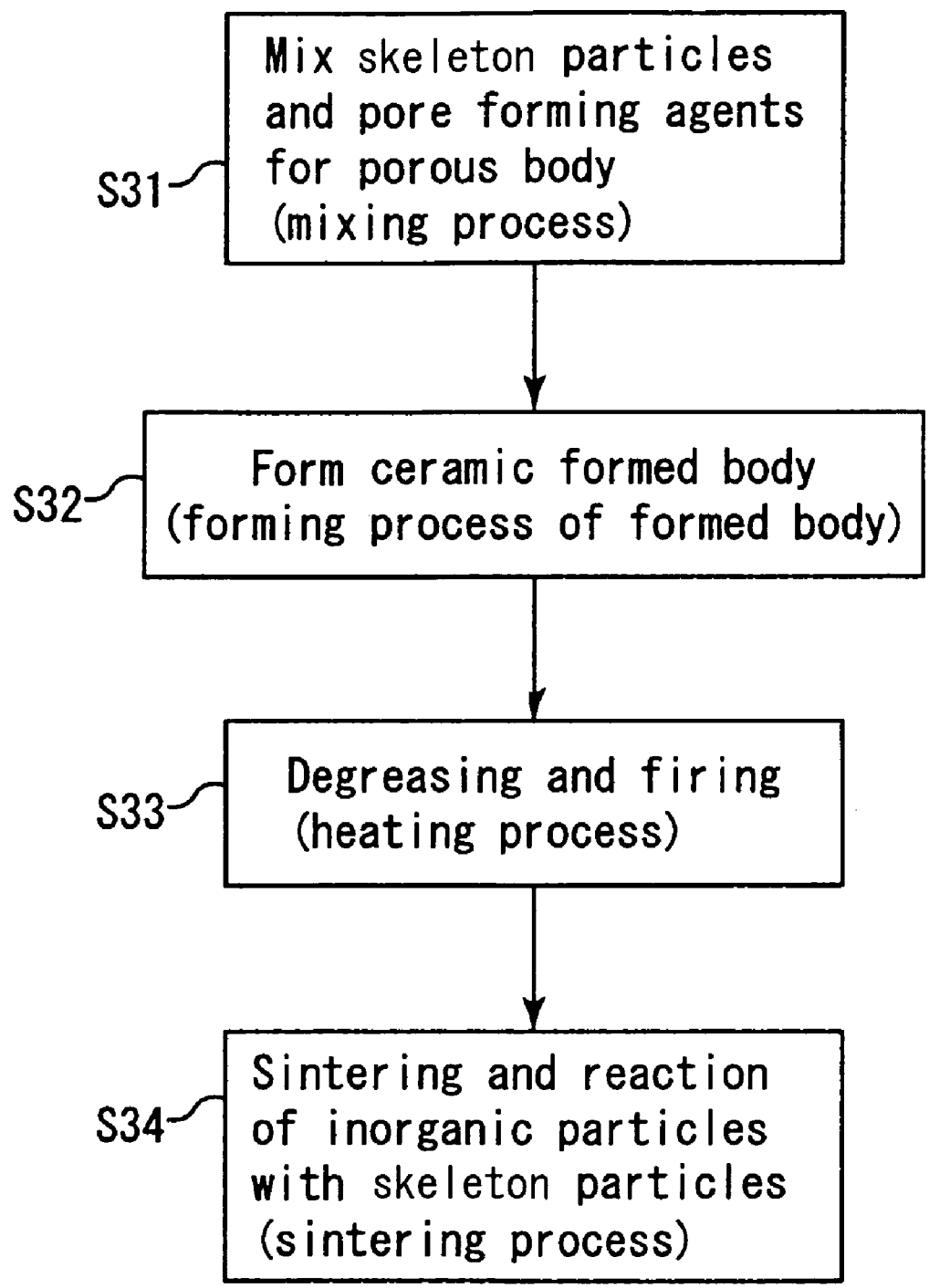
FIG. 12 is a process chart that shows manufacturing processes of a porous body according to the present invention.

Next, description will be given of a manufacturing method of a porous body that uses the above-mentioned pore forming agent for a porous body. FIG. 12 is a flowchart that shows manufacturing processes of the porous body, and FIGS. 13A to 13D are cross-sectional views that show the manufacturing processes of the porous body.

Basically, even when any one of the pore forming agents for a porous body shown in FIGS. 1 to 5 is used, a porous body can be manufactured through approximately the same processes; therefore, description will be given of a case in which the pore forming agent 40b for a porous body (in which a plurality of inorganic particles 4 are contained in each of the inorganic micro-balloons 5), shown in FIG. 4B, is used.

As shown in FIG. 12, in manufacturing process of a porous body, a porous body 130 can be obtained through the following processes: a mixing process (step S31) in which skeleton particles and a pore forming material (made of organic polymer particles and inorganic particles) are mixed with each other, a formed-body forming process (step S32) in which a formed body 7 is formed, a heating process (step S33) in which the formed body 7 is degreased and fired so that the organic polymer particles are thermally decomposed, and a sintering process (step S34) in which the firing process is continued to carry out a sintering reaction while the reaction between the inorganic particles and the skeleton particles is accelerated.

In the case where a sintering aid is used as the inorganic particles, it is possible to lower the sintering temperature while the breaking strength of the porous body is properly maintained. Although the following description is based upon an inference, the organic polymer particles 2 forming the pore forming agent 40b for a porous body are thermally decomposed to form a gas, and this gas is released to form voids, while the inorganic component, which functions as a sintering aid for assisting the sintering process at a low temperature, accelerates the mutual sintering reaction between the skeleton particles so that a porous body, which has high mechanical strength while maintaining a high porosity, can be obtained; thus, it becomes possible to carry out the sintering process at a low temperature.

Moreover, in the manufacturing method of the present invention, for example, silicon carbide particles are desirably used as the skeleton particles, and a pore forming material for a porous body containing alumina is desirably used as the pore forming material for a porous body. In this case, in the succeeding firing process, alumina, contained in the pore forming material for a porous body, functions as the sintering aid to lower the firing temperature or to accelerate the sintering process; thus, it becomes possible to manufacture a porous body that is superior in mechanical characteristics.

Figure 13A:
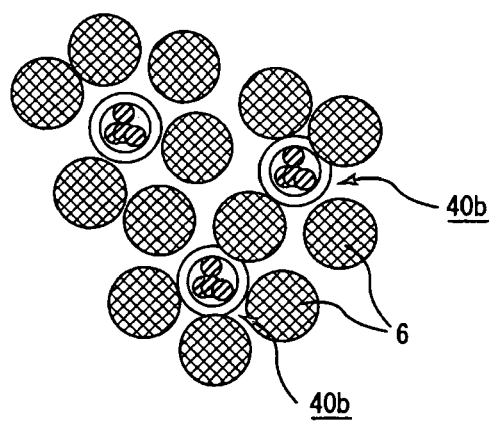
FIGS. 13A to 13D are cross-sectional views that show manufacturing processes of the porous body according to the present invention.

More specifically, first, as shown in FIG. 13A, the pore forming material 40b for a porous body and the skeleton particles 6 are mixed.

With respect to the skeleton particles 6, examples thereof may include particles made of nitride ceramics such as aluminum nitride, silicon nitride, boron nitride, and titanium nitride, carbide ceramics such as silicon carbide, zirconium carbide, titanium carbide, tantalum carbide, tungsten carbide, and boron carbide ($B_4C$), oxide ceramics such as alumina, zirconia, cordierite, mullite, and silica, and the like.

Moreover, silicon-containing ceramics in which metal silicon is blended in the above-mentioned ceramics and ceramics which are bonded by silicon and a silicate compound may also be used, and, for example, a material, prepared by blending metal silicon or the like in silicon carbide. Furthermore, metal such as aluminum, iron, metal silicon or the like may be used as the skeleton particles 6, or the above-mentioned ceramics and metal may be used in combination. Here, a semiconductor of silicon or the like may be used as the skeleton particles 6, and the semiconductor may be used in combination with the above-mentioned ceramics.

With respect to the particle diameter of the skeleton particles 6, although not particularly limited, those which are less likely to shrink in the succeeding firing process are desirably used, and for example, those particles, prepared by combining 100 parts by weight of powder having an average particle diameter in the range of about 5.0 to about 50 µm with about 5 to about 65 parts by weight of powder having an average particle diameter in the range of about 0.1 to about 3.0 µm, are desirably used.

The particle diameter of the pore forming agent for a porous body is desirably set in the range of about 0.5 to about 10 times, more desirably about 0.5 to about 5.0 times the particle diameter of the skeleton particles 6.

Thus, it becomes possible to manufacture a porous body that is superior in performance, such as a small pressure loss and the like, as a filter, when used as a filter for purifying exhaust gases.

More specifically, a material, prepared by adding a binder, a dispersant solution and the like to the pore forming material 40b for a porous body and skeleton particles 6, if necessary, is mixed by using an attritor or the like, and sufficiently kneaded by using a kneader or the like.

With respect to the above-mentioned binder, although not particularly limited, examples thereof may include methylcellulose, carboxy methylcellulose, hydroxy ethylcellulose, polyethylene glycol, phenol resins, epoxy resins and the like.

With respect to the above-mentioned dispersant solution, although not particularly limited, examples thereof may include an organic solvent such as benzene or the like, alcohol such as methanol or the like, water and the like.

The blend amount of the pore forming material 40b for a porous body is properly set depending on the porosity or the like of the porous body 10 to be manufactured, without being particularly limited, and is normally set in the range of about 10 to about 200 parts by weight with respect to 100 parts by weight of the skeleton particles. In particular, it is desirably blended so that the organic polymer component in the pore forming material 40b for a porous body is set in the range of about 5 to about 50 parts by weight with respect to 100 parts by weight of the skeleton particles. Desirably, the blend amount of the binder is normally set in the range of about 1 to about 10 parts by weight with respect to 100 parts by weight of ceramic powder.

Moreover, the dispersant solution is properly blended so that the viscosity of the mixture is set within a predetermined range.

Upon mixing the pore forming material 40b for a porous body and the skeleton particles 6, a forming assistant may be added thereto, if necessary.

With respect to the forming assistant, although not particularly limited, examples thereof may include ethylene glycol, dextrin, fatty acid soap, polyalcohol and the like.

Moreover, in the above-mentioned process, a pore forming material, made of only the aforementioned inorganic balloons and organic polymer, may be added thereto, if necessary.

Figure 13B:
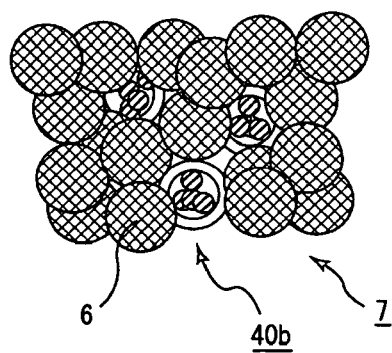

Next, as shown in FIG. 13B, the above-mentioned mixture is formed to manufacture a formed body 7 made of a pore forming material 1 for a porous body and the skeleton particles 6. The forming process of the mixture is carried out by an extrusion-forming process or the like.

Figure 13C:
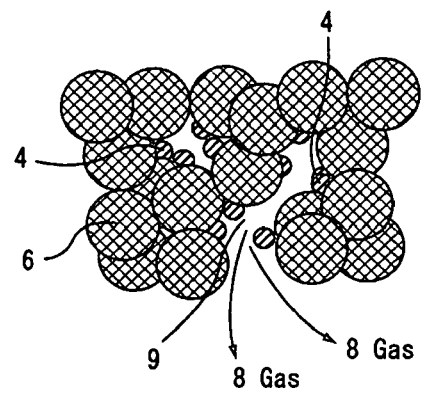

As shown in FIG. 13C, the organic polymer particles 2 are heated to be thermally decomposed to be a gas 8 so that the organic polymer particles 2 are eliminated to form pores (voids) 9.

The heating treatment may be carried out in divided processes including a drying process, a degreasing process and a firing process. The drying process may be carried out on the formed body by using a dryer, such as a microwave dryer, a hot-air dryer, a dielectric dryer, a decompression dryer, a vacuum dryer, a freeze dryer or the like.

The conditions of the degreasing process and the firing process may be set in the same manner as those conditions conventionally used for manufacturing a porous body.

More specifically, the degreasing process may be carried out, for example, under a heating condition to a temperature in the range of about 300° C. to about 650° C. in an oxygen-containing atmosphere.

The firing process may be carried out, for example, under a heating condition to a temperature in the range of about 1000° C. to about 2300° C. in an inert gas atmosphere such as nitrogen, argon or the like.

Figure 13D:
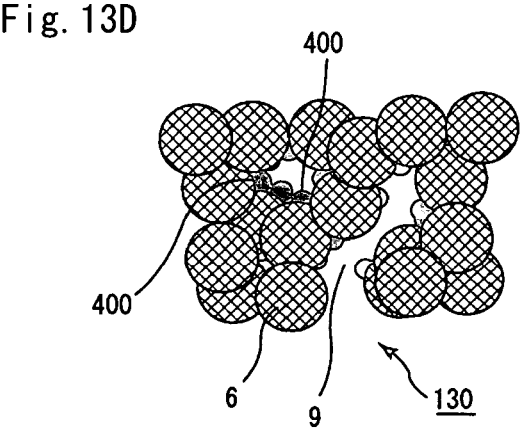

In the case where the inorganic particles 4, contained in the pore forming material 40b for a porous body, include a component to serve as a sintering aid, the inorganic particles 4 and a reaction product (inorganic compound) 400 resulting from the reaction between the inorganic particles 4 and the skeleton particles 6 are generated on the inner-wall surface of each pore (void) 9, as shown in FIG. 13D.

In the case where the inorganic particles and the like serve as a sintering aid, it becomes possible to lower the firing temperature in comparison with a case where the skeleton particles are sintered alone. Moreover, by accelerating the firing process, it becomes possible to manufacture a porous body 140 that is superior in mechanical characteristics. For example, in the case where silicon carbide powder is used as the aggregate, if alumina is used as the inorganic particles, the firing temperature (normally, about 2200° C.) can be lowered to a range of about 100° C. to 300° C.

Upon manufacturing the porous body through the above-mentioned method, by using the above-mentioned various pore forming agents for a porous body, various porous bodies having various effects can be manufactured. Hereinafter, description will given of other embodiments in succession.

Figure 14A:
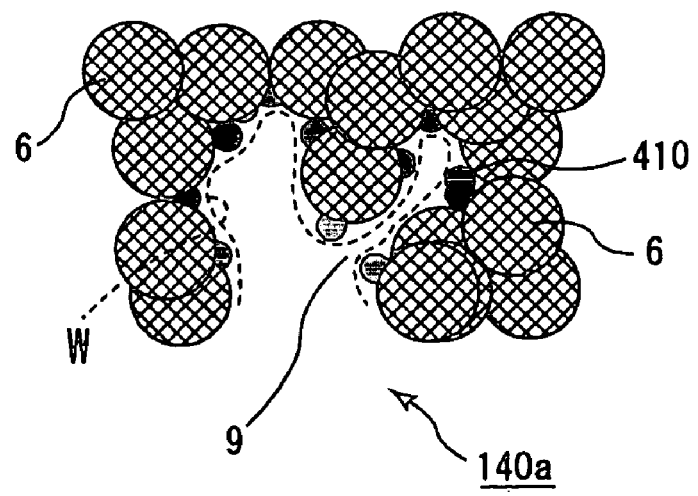
FIGS. 14A and 14B are explanatory views that schematically show one example of the porous body of the present invention.
Figure 14B:
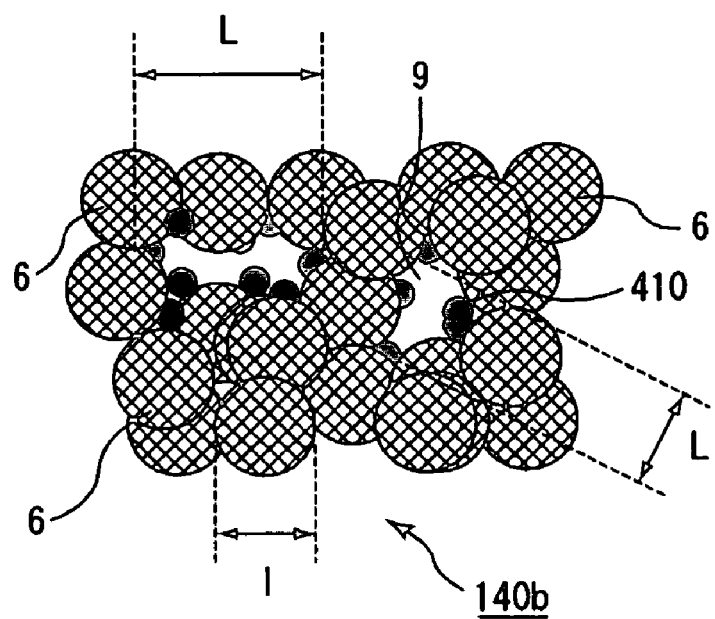

FIGS. 14A and 14B are explanatory views that show another embodiment of the porous body.

A porous body 140a, shown in FIG. 14A, is constituted by skeleton particles 6 and voids 9 formed in the skeleton particles 6, and an inorganic compound 410 containing an element different from the skeleton particles 6 is adhered to at least a inner surface (inner wall) of the voids 9 formed in the skeleton particle 6.

In the case where the inorganic compound 410 that contains an element different from the skeleton particles 6 firmly bonds the skeleton particles 6 to each other, even if the voids 9 are large, it becomes possible to maintain the breaking strength of the porous body 140a in a high level.

The inorganic compound 410 may be inorganic particles 4 contained in the pore forming agent for a porous body, or may be a product formed through the reaction between the inorganic particles 4 and the skeleton particles 6, or a product derived from the inorganic particles 4 that have been changed through a heating process or the like.

A porous body 140b, shown in FIG. 14B, is constituted by skeleton particles 6 and voids 9, formed in the skeleton particles 6, said void has a major diameter L that is larger than a major diameter l of the skeleton particle, and an inorganic compound 410 containing an element different from the skeleton particles 6 is adhered to at least a inner surface of the void 9 formed in the skeleton particle 6 so that the inorganic compound 410 firmly bonds the skeleton particles 6 to one other.

In other words, the porous body 140b is allowed to have avoid 9 (pore) that is larger than a void that would be originally formed by the skeleton particles 6, and, for example, when this is used as a filter, a fluid, such as gas or liquid, is allowed to easily flow to lower the pressure loss. Moreover, when the filter is used for a long time, the fluid is filtered not only through the wall surface of the filter, but also through the inside of the wall so that the pressure loss can be reduced.

Moreover, even in the case where such large voids 9 are contained, since the inorganic compound 410 that contains an element different from the skeleton particles 6 firmly bonds the skeleton particles 6 to one another, it is possible to maintain the breaking strength of the porous body 140b in a high level.

Figure 15A:
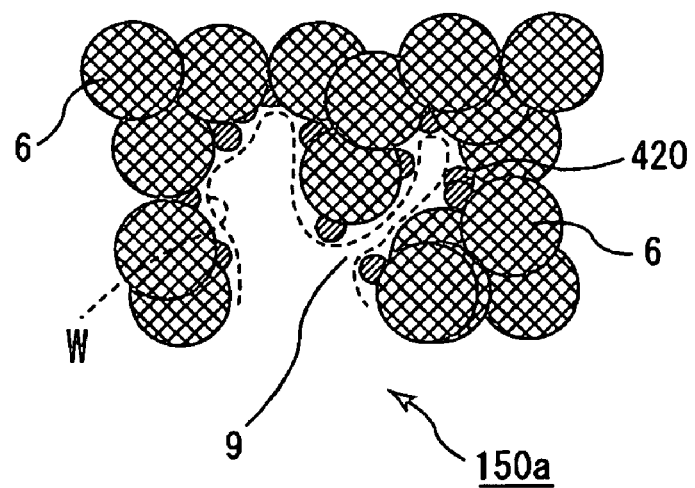
FIGS. 15A and 15B are explanatory views that schematically show another example of the porous body of the present invention.
Figure 15B:
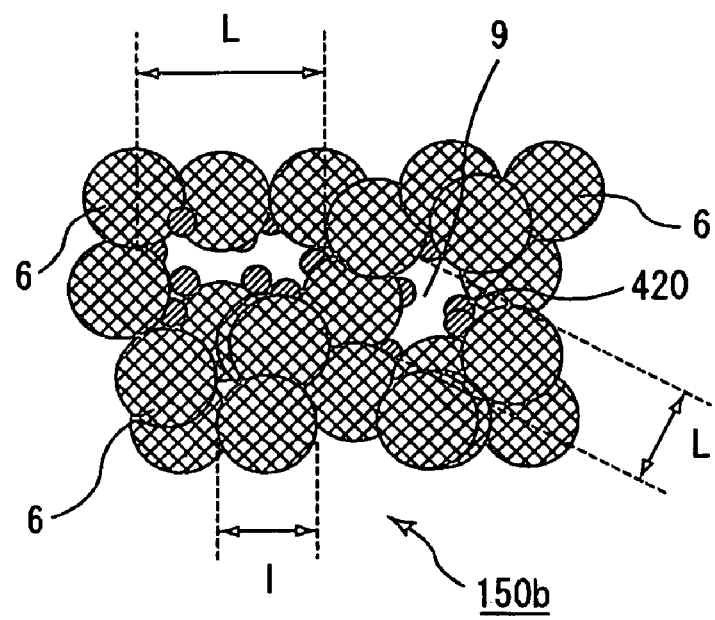

FIGS. 15A and 15B are explanatory views that show still another embodiment of the porous body.

A porous body 150a, shown in FIG. 15A, is constituted by skeleton particles 6 and voids 9 formed in the skeleton particles 6, and a compound containing an element that is the same kind as the skeleton particles 6, or a simple substance 420 (hereinafter, referred to as the same kind-element containing compound) composed of an element that is the same kind as the skeleton particles 6, is locally present on at least on inner surface (inner wall) of the voids 9 formed in the skeleton particles 6.

The expression, "the same kind-element containing compound 420 is locally present", refers to the fact that, for example, when silicon carbide is adopted as the skeleton particles 6, $SiO_2$ and Si (silicon) are locally present. In other words, in the case where the skeleton particles 6 are composed of one kind or two or more kinds of compounds or a simple substance, a compound containing at least one of elements forming the above-mentioned compounds or a simple substance is locally present.

Here, in the case where the same kind-element containing compound 420 firmly bonds the skeleton particles to each other, even if the voids 9 are large, it is possible to maintain the breaking strength of the porous body 150a in a high level.

A porous body 150b, shown in FIG. 15B, is constituted by skeleton particles 6 and voids 9, formed in the skeleton particles 6, said void has a major diameter L that is larger than a major diameter l of the skeleton particle 6, and the same kind-element containing compound 420 is locally present at least on inner surface of the voids 9 formed in the skeleton particles 6. In other words, the porous body 150b is allowed to have a void 9 (pore) that is larger than a void that would be originally formed by the skeleton particles 6, and, for example, when this is used as a filter, a fluid, such as gas or liquid, is allowed to easily flow to lower the pressure loss. Moreover, when the filter is used for a long time, the fluid is filtered not only through the wall surface of the filter, but also through the inside of the wall so that the pressure loss can be reduced.

Moreover, even in the case where such large voids 9 are contained, since the same kind-element containing compound 420 firmly bonds the skeleton particles to each other, it is possible to maintain the breaking strength of the porous body 150b in a high level.

Figure 16A:
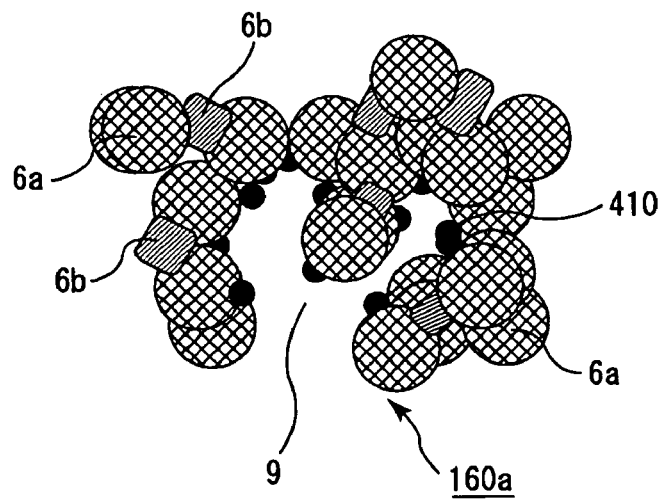
FIGS. 16A to 16C are explanatory views that schematically show still another example of the porous body of the present invention.
Figure 16B:
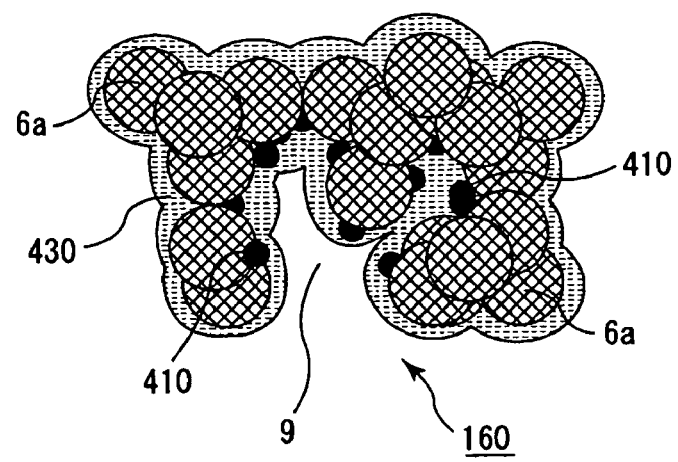
Figure 16C:
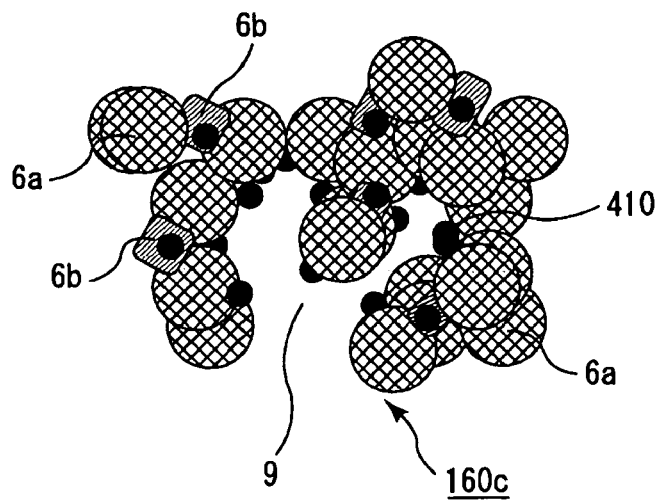

FIGS. 16A to 16C are explanatory views that show still another embodiment of the porous body.

A porous body 160a, shown in FIG. 16A, is designed so that an inorganic compound 410 containing an element different from the skeleton particles 6 is present at least on inner surface (inner wall) of the voids 9 formed in the skeleton particles 6 (6a, 6b).

In the skeleton particles 6, skeleton particles 6a of one kind are bonded to each other through skeleton particles 6b of another kind, and since the inorganic compound 410 containing an element different from the skeleton particles 6 firmly bonds the skeleton particles to each other, it is possible to increase the breaking strength and the toughness value of the porous body 160a even in the case of large voids 9, and consequently to improve the thermal-impact resistant property.

Here, as shown in FIG. 16C, the inorganic compound 410 may be contained in the skeleton particles 6b.

With respect to the skeleton particles 6b that bond the skeleton particles 6a of one kind to each other, metal or a semiconductor is desirably used. With respect to the metal, examples thereof may include aluminum, iron, silicon and the like, and with respect to the semiconductor, examples thereof may include silicon and the like.

A porous body 160b, shown in FIG. 16B, is designed so that an inorganic compound 410 containing an element different from the skeleton particles 6 is present at least on inner surface(inner wall) of the voids 9 formed in the skeleton particles 6. The inner wall of the void 9 is coated with a catalyst (catalyst supporting member) 430.

The porosity of the porous body of the present invention is desirably set in the range of about 45% to about 85%, more desirably about 50% to about 85%.

Since the porosity of the porous body of the present invention is set in the range of about 45% to about 85%, it is possible to properly maintain the shape upon manufacturing a porous body, and consequently to manufacture the porous body without causing a reduction in the strength. Moreover, when the above-mentioned porous body is used as a filter, it becomes possible to maintain the initial pressure loss in a low level, and also to suppress an increase in the pressure loss due to deposition of the filtered matters.

Here, the above-mentioned porosity can be measured through conventionally known methods, such as a mercury injection method, Archimedes method, a measuring method using a scanning electronic microscope (SEM), and the like.

Moreover, in the case of the porous body constituted by skeleton particles 6 and voids 9, formed in the skeleton particles 6, said void has a major diameter L larger than the major diameter l of the skeleton particle 6, the major diameter of the void is desirably set in the range of about 100% to about 150% of the major diameter l of the skeleton particle.

Here, with respect to the voids 9 contained in the porous body, only those voids the major diameter L of which is the same as the major diameter l of the skeleton particle or larger than the major diameter l of the skeleton particle are not necessarily contained, and those voids the major diameter L of which is smaller than the major diameter l of the skeleton particle may also be contained in a mixed manner. Even when those voids the major diameter L of which is smaller than the major diameter l of the skeleton particle are contained in a mixed manner, it is possible to achieve the object of increasing the deposition capacity of the filtered matters, when the porous body is used as a filter.

The major diameter l of the skeleton particle and the major diameter L of the void can be calculated through the following processes in which the porous body is observed at arbitrary 10 points thereof through an SEM system under a magnification of about 350 times so that calculations are made based upon the average value.

The average pore diameter of the porous body is desirably set in the range of about 5 μm to about 100 μm. When the average pore diameter is about 5 μm to 100 μm, the pressure loss does not become higher. Moreover, the pore diameter does not become too large, and when the porous body is used as a filter for an exhaust gas purifying device, particulates can be completely captured.

With respect to the inorganic compound (simple substance) 410 which is present at least on inner surface (inner wall) of the voids 9 formed in the skeleton particles 6, examples thereof may include nitride ceramics such as aluminum nitride, silicon nitride, boron nitride, and titanium nitride; carbide ceramics such as silicon carbide, zirconium carbide, titanium carbide, tantalum carbide, and tungsten carbide; oxide ceramics such as alumina, zirconia, cordierite, mullite, and silica; metals such as Si, Fe and Al; and metal compounds such as iron oxide. Hereinafter, the inorganic compound (simple substance) is referred to simply as inorganic compound.

When the skeleton particles 6 are made of silicon carbide particles, the inorganic compound 410 is desirably comprising at least one kind of oxide ceramics, for example, selected from the group consisting of alumina, mullite, silica, titania and silica-alumina, and is more desirably prepared as a compound containing Al, Si, Ti or B.

With respect to the compound containing Al, Si, Ti or B, example thereof may include the above-mentioned aluminum nitride, silicon nitride, boron nitride, titanium nitride and the like.

These materials allow the catalyst 430 to be easily supported thereon. There as on for this is explained as follows: when the above-mentioned compound is adhered to the inside of the void 9, the surface layer of the oxide ceramics is allowed to have a functional group having a polarity, such as an OH group or the like, so that upon applying a catalyst onto the porous body, an oxide catalyst (perovskite type), a catalyst supporting member (coat layer having a high specific surface area, such as alumina, titania, zirconia or the like) and a catalyst can be easily supported thereon, and the catalyst, once supported thereon, becomes less likely to be separated.

Moreover, each of these inorganic compounds itself may be a catalyst.

When the inorganic compound 410 is made of oxide ceramics, it is possible to prevent corrosion of the porous body. This is presumably because, in the case where the inorganic compound 410 is made of oxide ceramics, components contained in exhaust gases, such as sulfur, alkali metals, alkali-earth metals and the like, are preferentially reacted with the oxide ceramics, when the porous body is used as a filter for purifying exhaust gases; thus, it becomes possible to competitively prevent the skeleton particles forming the porous body from reacting with sulfur and the like in exhaust gases, and consequently to prevent the porous body from being corroded.

Figure 17A:
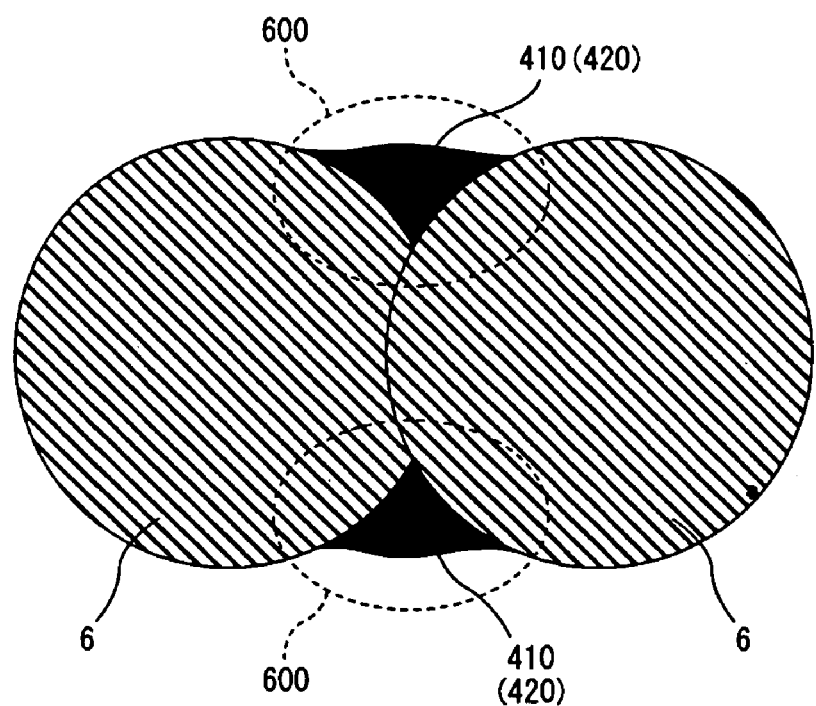
FIG. 17A is an enlarged cross-sectional view that shows a porous body to which a catalyst is applied as shown in FIG. 16B.
Figure 17B:
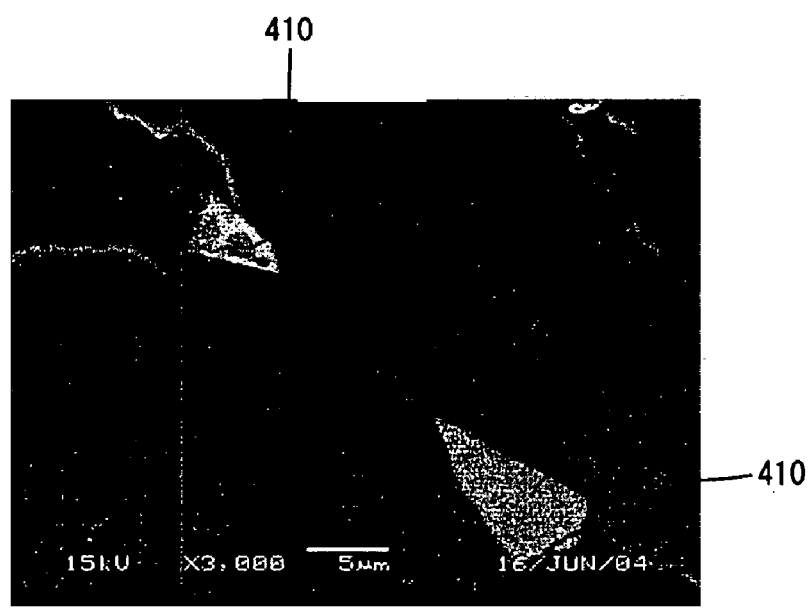
FIG. 17B is a scanning electron microscopic (SEM) photograph that shows a specific shape thereof.

As shown in FIG. 17A, the porous body of the present invention desirably has a structure in which the inorganic compound 410 or the same kind-element containing compound 420 is present at the neck portion 600 of the skeleton particles 6. FIG. 17B is as canning electron microscopic (SEM) photograph that shows a specific shape in this case. In the case where the inorganic compound 410 or the same kind-element containing compound 420 is present at the neck portion 600, since the connecting portion (neck portion) becomes thicker, the combining force between the skeleton particles 6 increases so that the strength of the porous body can be improved.

Here, the inorganic compound 410 is desirably prepared as a crystal compound (simple substance) that has been redeposited from a liquid phase. Since it is derived from the liquid phase, a fused solution is once gathered to the neck portion due to surface tension, and the redeposition is then allowed to progress so that the inorganic compound (simple substance) 410 is easily formed on the neck portion.

The neck portion 600 of the skeleton particles 6 refers to one portion of inner surface of the voids formed in the skeleton particles, which corresponds to an area in the vicinity of the periphery of an interface at which the skeleton particles are made in contact with each other.

In the case where silicon carbide is used as the skeleton particles 6 with a material such as alumina and aluminum being used as the inorganic compound 410 that adheres to the void portion of the pore forming agent for a porous body, the alumina is redeposited on the neck portion of the silicon carbide from the liquid phase, or allowed to form a composite material.

Next, description will be given of the honeycomb structural body of the present invention.

The honeycomb structural body of the present invention comprises the above-mentioned porous body of the present invention.

Figure 18:
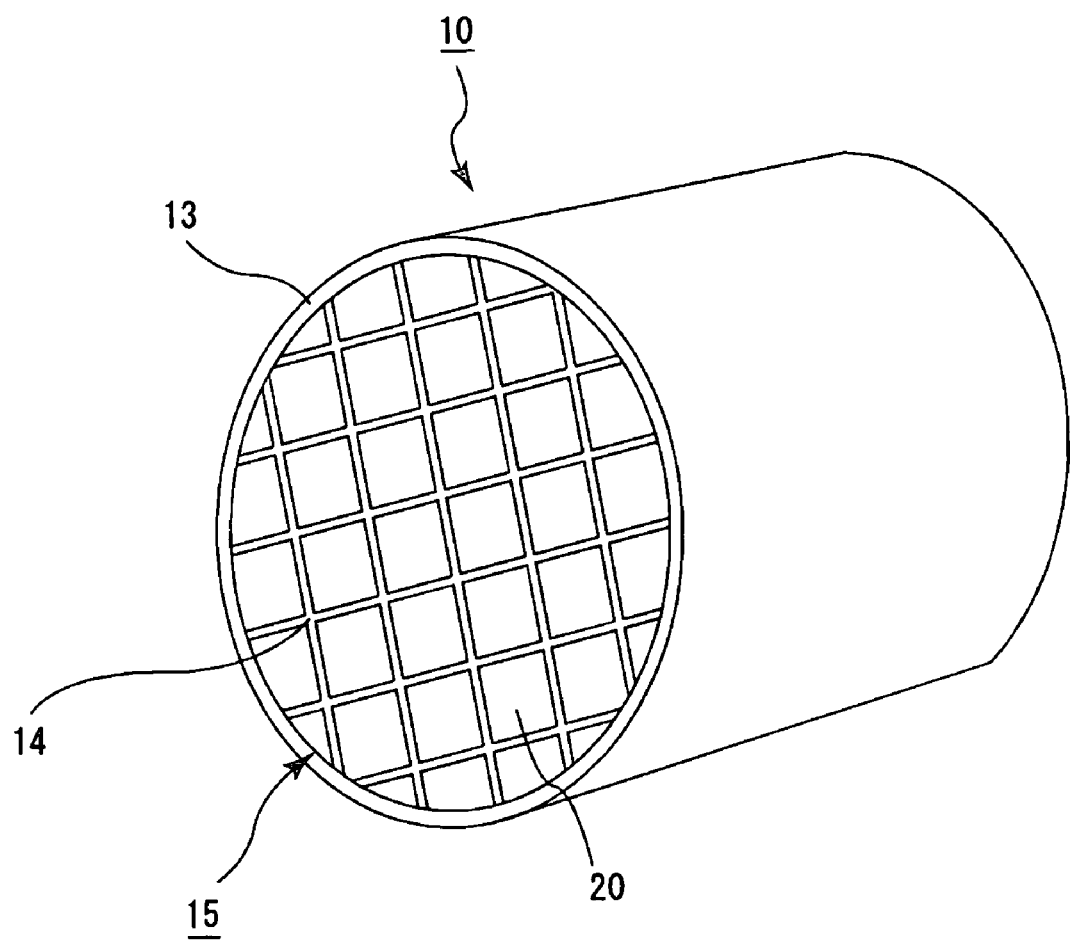
FIG. 18 is a perspective view that schematically shows one example of a honeycomb structural body of the present invention.
Figure 19A:
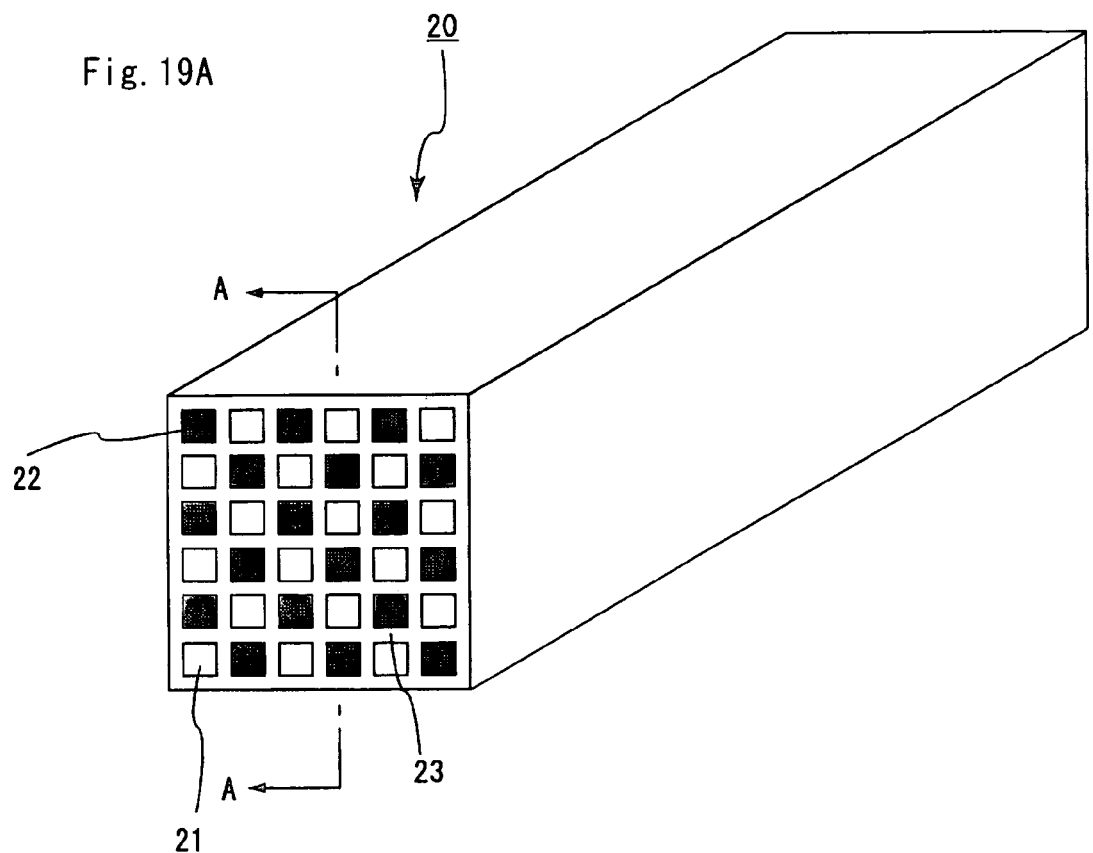
FIG. 19A is a perspective view that schematically shows a porous ceramic member that forms the honeycomb structural body shown in FIG. 18.
Figure 19B:
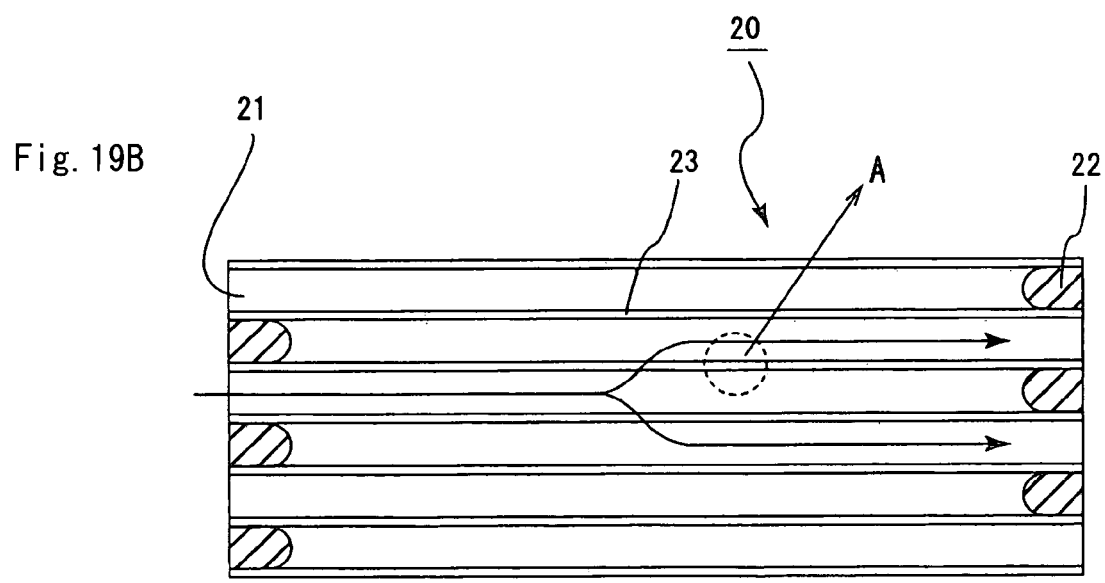
FIG. 19B is a cross-sectional view taken along line A-A of FIG. 19A.

FIG. 18 is a perspective view that schematically shows one example of the honeycomb structural body of the present invention, FIG. 19A is a perspective view that schematically shows one example of a porous ceramic member (porous body) that forms the honeycomb structural body of the present invention, and FIG. 19B is a cross-sectional view taken along line A-A of FIG. 19A.

As shown in FIG. 18, in the honeycomb structural body 10 of the present invention, a plurality of porous ceramic members 20 are bound to one another through sealing material layer 14 to form a ceramic block 15, and a sealing material layer 13 is formed on the periphery of the ceramic block 15. Here, as shown in FIG. 2, the porous ceramic member 20 has a structure in which a number of through holes 21 are placed in parallel with one another in the length direction so that a partition wall 23 that separates the through holes 21 from each other is allowed to function as a filter.

In other words, as shown in FIG. 19B, each of the through holes 21 formed in the porous ceramic member 20 has either of it sends on the inlet-side and outlet-side of exhaust gases sealed with a plug 22; thus, exhaust gases that have entered one of the through holes 21 are allowed to flow out of another through hole 21 after always passing through the partition wall 23 that separates the corresponding through holes 21.

Moreover, the sealing material layer 13 is provided so as to prevent exhaust gases from leaking through the peripheral portion of each ceramic block 15 when the honeycomb structural body 10 is installed in an exhaust passage of an internal combustion engine.

Here, the porous ceramic member 20 is constituted by porous bodies 130, 140a, 140b, 150a, 150b, 160a, 160b and 160c (hereinafter, described as porous bodies 130 to 160c) as shown in the aforementioned FIGS. 13 to 16.

Figure 20:
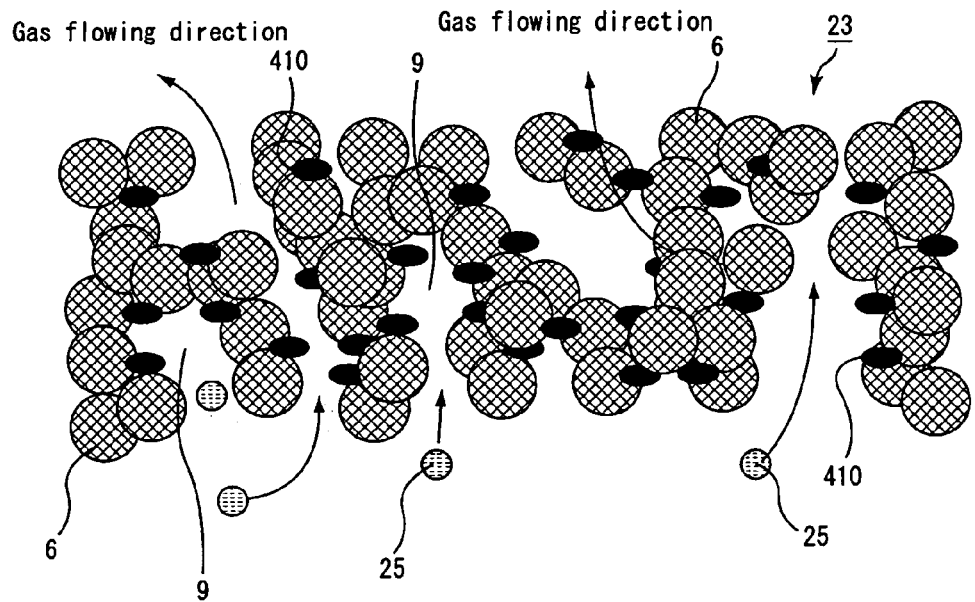
FIG. 20 is an explanatory view that schematically shows one portion of the honeycomb structural body of the present invention.

FIG. 20 is an enlarged cross-sectional view showing the partition wall 23 of the porous ceramic member 20. The partition wall is basically made of one of the aforementioned porous bodies 130 to 160c.

The partition wall 23 is constituted by skeleton particles 6, voids 9 formed by the particles 6 and an inorganic compound 410 that is contained in the inner wall of each of the voids 9. Particulates 25 are trapped not only by the surface of the wall, but also by the inside of each of the voids 9 contained in the wall. In the honeycomb structural body of the present invention, the voids 9, formed in the partition wall 23 (porous body), are made larger without causing a reduction in the strength.

The honeycomb structural body 10 having the above-mentioned structure is installed in an exhaust passage in an internal combustion engine so that particulates in exhaust gases discharged from the internal combustion engine are captured by the partition wall 23 when passing through the honeycomb structural body 10; thus, the exhaust gases are purified.

Since the honeycomb structural body 10 of this type has superior heat resistance and provides easy regenerating processes and the like, it has been applied to various large-size vehicles, vehicles with diesel engines, and the like.

With respect to the material for the sealing material layer 14, although not particularly limited, examples thereof may include inorganic binders, organic binders, inorganic fibers, inorganic particles for a sealing material layer, and the like.

With respect to the inorganic binder, examples thereof may include silica sol, alumina sol, titania sol and the like. Each of these may be used alone, or two or more of these may be used in combination. Among these inorganic binders, silica sol is more desirably used.

With respect to the organic binder, examples thereof may include polyvinyl alcohol, methyl cellulose, ethyl cellulose, carboxymethyl cellulose and the like. Each of these may be used alone or two or more kinds of these may be used in combination. Among these organic binders, carboxymethyl cellulose is more desirably used.

With respect to the inorganic fibers, examples thereof may include ceramic fibers such as silica-alumina, mullite, alumina, silica and the like, and the like. Each of these may be used alone or two or more kinds of these may be used in combination. Among these inorganic fibers, silica-alumina fibers are more desirably used.

With respect to the inorganic particles for a sealing material layer, examples thereof may include carbides, nitrides and the like, and specific examples thereof may include inorganic powder or whiskers made of silicon carbide, silicon nitride, boron nitride or the like, and the like. Each of these may be used alone, or two or more kinds of these may be used in combination. Among the inorganic fine particles for a sealing material layer, silicon carbide having a superior thermal conductivity is desirably used.

Moreover, the sealing material layer 14 may contain a foaming material. Thus, the foaming material is capable of changing the porosity of the sealing material layer 14, and consequently adjusts the thermal expansion coefficient of the sealing material layer 14.

With respect to the foaming material, although not particularly limited as long as it is decomposed upon heating at the time of use, examples thereof may include known foaming materials, such as ammonium hydrogencarbonate, ammonium carbonate, amyl acetate, butyl acetate, and diazoaminobenzene.

The sealing material layer 14 may contain a resin such as a thermoplastic resin, a thermosetting resin or the like, balloons made of an inorganic substance, an organic substance or the like, and the like. These materials make it possible to control the porosity of the sealing material layer 14, and consequently to adjust the thermal expansion coefficient of the sealing material layer 14.

With respect to the thermoplastic resin, although not particularly limited, examples thereof may include acrylic resin, phenoxy resin, polyether sulfone, polysulfone and the like, and with respect to the above-mentioned thermosetting resin, although not particularly limited, examples thereof may include epoxy resin, phenolic resin, polyimide resin, polyester resin, bismaleimide resin, polyolefin-based resin, polyphenylene ether resin and the like.

With respect to the shape of these resins, although not particularly limited, examples thereof may include desired shapes such as a spherical shape, an elliptical shape, a cubic shape, a monothilic shape, a pillar shape, a plate shape and the like.

In the case of the spherical shape of the resin, the average particle diameter is desirably set in the range of about 30 to about 300 μm.

Here, the balloon is a concept including the bubble and the hollow sphere shape, and with respect to the above-mentioned organic balloon, although not particularly limited, examples thereof may include acrylic balloons, polyester balloons and the like. With respect to the above-mentioned inorganic balloon, although not particularly limited, examples thereof may include alumina balloons, glass micro-balloons, shirasu balloons, fly ash balloons (FA balloons), mullite balloons and the like.

The shape, the average particle diameter and the like of these balloons are desirably set in the same manner as the above-mentioned resins.

In the honeycomb structural body 10 shown in FIG. 18, the shape of the ceramic block 15 is a cylindrical shape; however, in the honeycomb structural body of the present invention, not limited to the cylindrical shape, the shape of the ceramic block may be formed into a desired shape such as an elliptical pillar shape, a rectangular pillar shape or the like.

Moreover, with respect to the peripheral sealing material layer 13 formed on the periphery of the ceramic block 15, although not particularly limited, for example, the same material as that of the sealing material layer 14 may be used.

Furthermore, the honeycomb structural body of the present invention may have a catalyst capable of converting CO, HC, NOx and the like in the exhaust gases, which is supported in the pores thereof.

Figure 21:
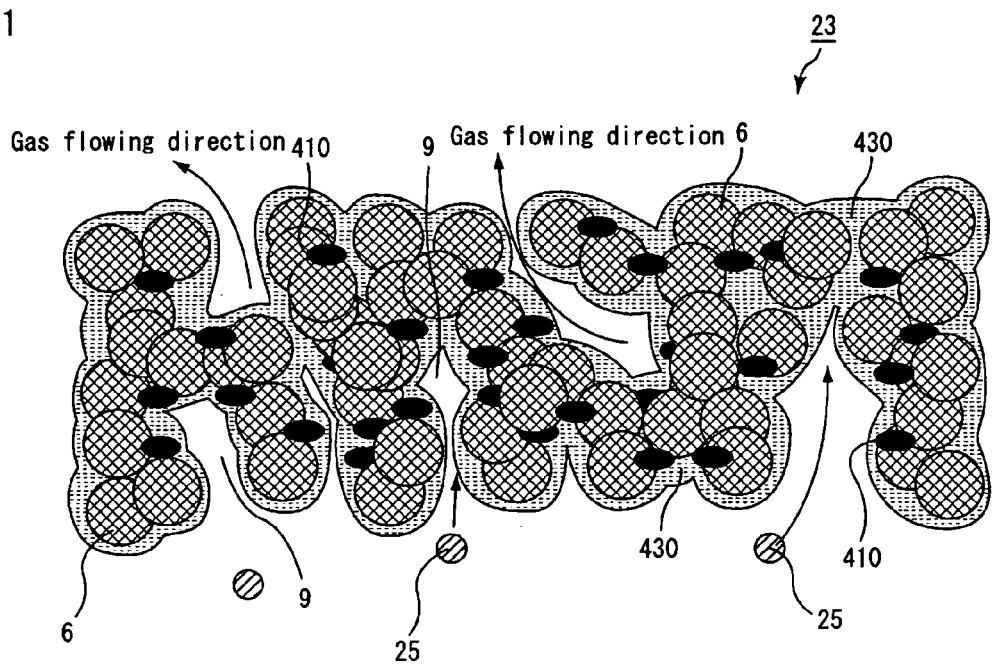
FIG. 21 is an explanatory view that schematically shows one portion of the honeycomb structural body of the present invention to which a catalyst is applied.

FIG. 21 is an enlarged cross-sectional view that shows a partition wall 23 on which a catalyst (catalyst supporting member) 420 is supported.

The partition wall 23 is constituted by skeleton particles 6, voids 9 formed by the particles 6, an inorganic compound 410 that is contained in the inner wall of each of the voids 9 and the catalyst 430. Particulates 25 are trapped not only by the surface of the partition wall 23, but also by the inside of each of the voids 9 contained in the partition wall 23.

The inorganic compound 410 and the catalyst 430 are bonded to each other so as to prevent the catalyst from separating and coming off.

When such a catalyst (catalyst supporting member) 420 is supported thereon, the honeycomb structural body 10 of the present invention is allowed to function as a filter capable of collecting particulates in exhaust gases, and also to function as a catalyst supporting member capable of accelerating oxidation of the particulates and converting CO, HC, NOx and the like contained in exhaust gases.

With respect to the catalyst 430, examples thereof may include noble metals such as platinum, palladium, rhodium and the like. The honeycomb structural body of the present invention in which the above-mentioned catalyst made of the noble metal is supported is allowed to function as a gas purifying device in the same manner as the conventionally known DPFs (Diesel Particulate Filters) with catalyst. Therefore, in the following description, the detailed explanation of the case in which the honeycomb structural body of the present invention also serves as a catalyst supporting member is omitted.

Here, with respect to the catalyst to be supported on the honeycomb structural body of the present invention, not particularly limited to the noble metal, any catalyst may be supported thereon as long as it can convert CO, HC, NOx and the like in the exhaust gases.

In the honeycomb structural body 10 shown in FIG. 18, the aperture ratio of the end face on the inlet side is the same as the aperture ratio of the end face on the outlet side; however, in the honeycomb structural body of the present invention, the two end faces are not necessarily required to have the same aperture ratio, and, for example, the aperture ratio of the end face on the inlet side may be set greater than the aperture ratio of the end face on the outlet side.

Here, the aperture ratio of the end face refers to a ratio of the area of the group of opened through holes to the total area of the end face, with respect to one of the end faces of the honeycomb structural body; and in the case of the honeycomb structural body 10 shown in FIG. 18, the aperture ratio is defined as a ratio of the area of the group of opened through holes to the entire surface, that is, the total area of the end face of the porous ceramic member 20.

Next, description will be given of a manufacturing method of the honeycomb structural body of the present invention.

FIGS. 22A to 22D are cross-sectional views that schematically show a manufacturing method of the honeycomb structural body of the present invention.

A porous ceramic member 20 is manufactured through the aforementioned manufacturing method of the porous body.

In the case where the porous ceramic member 20 is manufactured, after a raw formed body has been dried by using a microwave drier or the like, a mouth-sealing process which injects a plug to predetermined through holes is carried out, and this is again subjected to a drying process using a microwave drier or the like, and then subjected to a degreasing process and a firing process so that the porous ceramic member 20 is formed.

With respect to the above-mentioned plug, not particularly limited, for example, the same material as the above-mentioned mixed composition may be used.

Figure 22A:
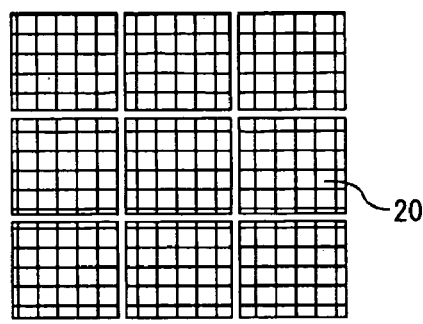
FIGS. 22A to 22D are cross-sectional views that show manufacturing processes of the honeycomb structural body of the present invention.
Figure 22B:
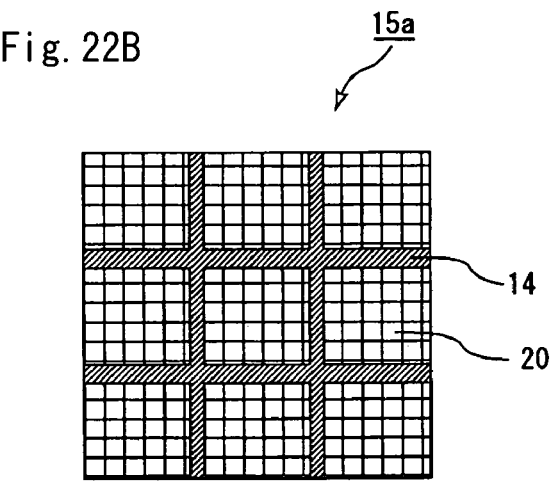

Next, a ceramic aggregated body 15a is manufactured (see FIG. 22B).

In this case, an adhesive paste to form a sealing material layer 14 is applied onto the porous ceramic member 20 with a predetermined thickness, and another porous ceramic member 20 on which the adhesive paste has been applied is successively laminated thereon; thus, these processes are repeated so that a rectangular pillar-shaped ceramic aggregated body having a predetermined size is formed.

Figure 22C:
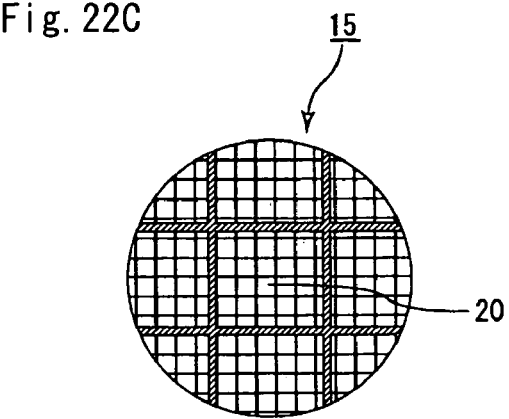

Further, this ceramic aggregated body is heated at a temperature in the range of about 50° C. to about 100° C. for about an hour so that the adhesive paste layer is dried and solidified to form a sealing material layer 14; thus, the ceramic aggregated body 15a is manufactured, and by cutting the peripheral portion thereof into a cylindrical shape using a diamond cutter or the like, a ceramic block 15 can be formed (see FIG. 22C).

With respect to the material for forming the sealing material layer 14, although not particularly limited, for example, the above-mentioned adhesive paste containing materials such as an inorganic binder, an organic binder, inorganic fibers and inorganic particles may be used.

Moreover, the above-mentioned adhesive paste may contain small amounts of moisture, solvents and the like; and most of such moisture, solvents and the like are normally scattered by heating and the like after application of the adhesive paste.

The lower limit of the content of the inorganic binder is desirably set to about 1% by weight, more desirably about 5% by weight, on the solid component basis. The upper limit of the content of the inorganic binder is desirably set to about 30% by weight, more desirably about 15% by weight, most desirably about 9% by weight on the solid component basis. Since the content of the inorganic binder is about 1% by weight to about 50% by weight, the bonding strength decrease is not caused; and also, the thermal conductivity decrease is not caused.

The lower limit of the content of the above-mentioned organic binder is desirably set to about 0.1% by weight, more desirably about 0.2% by weight, most desirably about 0.4% by weight on the solid component basis. The upper limit of the content of the organic binder is desirably set to about 5.0% by weight, more desirably about 1.0% by weight, most desirably about 0.6% by weight on the solid component basis. This is because since the content of the organic binder is about 0.1% by weight to about 50% by weight, migration of the adhesive layer 14 can be prevented, and when the sealing material layer 14 is exposed to high temperature, the problem that the organic binder is burned to be lost to cause degradation in the bonding strength does not occur.

The lower limit of the content of the above-mentioned inorganic fibers is desirably set to about 10% by weight, more desirably about 20% by weight on the solid component basis. The upper limit of the content of the inorganic fibers is desirably set to about 70% by weight, more desirably about 40% by weight, most desirably about 30% by weight on the solid component basis. This is because since the content of the inorganic fibers is about 10% by weight to about 70% by weight, the elasticity and strength are not decreased, and in addition, degradation in the thermal conductivity is not caused and its effects as an elastic member do not become poor.

The lower limit of the content of the above-mentioned inorganic particles for the sealing material layer is desirably set to about 3% by weight, more desirably about 10% by weight, most desirably about 20% by weight on the solid component basis. The upper limit of the content of the inorganic particles for the sealing material layer is desirably set to about 80% by weight, more desirably about 60% by weight, most desirably about 40% by weight on the solid component basis. This is because since the content of the inorganic particles for the sealing material layer is about 3% by weight to about 80% by weight, reduction in the thermal conductivity is not caused, and in addition, when the sealing material layer 14 is exposed to high temperature, degradation in the bonding strength is not caused.

The lower limit of the shot content of the above-mentioned inorganic fibers is desirably set to about 1% by weight, while the upper limit thereof is desirably set to about 10% by weight, more desirably about 5% by weight, most desirably about 3% by weight. Moreover, the lower limit of the fiber length is desirably set to about 1 μm, while the upper limit thereof is desirably set to about 100 mm, more desirably about 1000 μm, most desirably about 500 μm.

Since the shot content is about 1% by weight to about 10% by weight, the production is easy, and the wall faces of the porous ceramic member 20 are not damaged. Moreover, when the fiber length is about 1 μm to about 100 mm, a honeycomb structural body 10 with proper elasticity can be formed, and because the inorganic fibers tend not to be pilled-state fibers, dispersion of the inorganic particles becomes better and a thin sealing material layer 14 can be provided.

The lower limit of the particle diameter of the inorganic powder is desirably set to about 0.01 μm, more desirably about 0.1 μm. The upper limit of the particle diameter of the inorganic particles is desirably set to about 100 μm, more desirably about 15 μm, most desirably about 10 μm. This is because since the particle diameter of the inorganic particles is about 0.01 μm to about 100 μm, costs are not high, and a reduction in the filling rate and the subsequent degradation in the bonding strength and thermal conductivity are not caused.

Figure 22D:
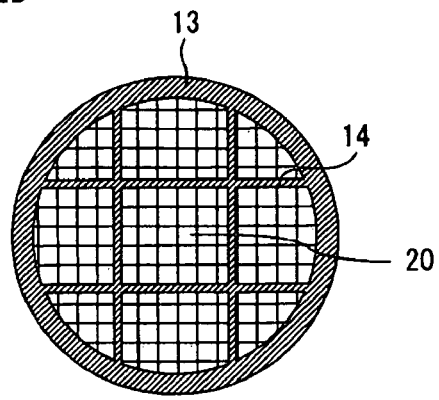

In addition to the above-mentioned inorganic fibers, inorganic binder, organic binder and inorganic particles for a sealing material layer, the adhesive paste may also contain moisture and other solvents such as acetone, alcohol and the like at a total weight of about 35% to about 65% by weight in order to make the adhesive paste softer to impart the fluidity thereto so as to be easily applied, and the viscosity of the adhesive paste is desirably set in the range of about 15 to about 25 Pa·s (about 10000 to about 20000 cps (cP)). out so as to form a sealing material layer 13 on the periphery of the ceramic block 15 (see FIG. 22D).

In this sealing material layer formation process, first, the ceramic block 15 the peripheral portion of which has been machined into a cylindrical shape is rotated around an axis on which it is supported in the length direction.

Although not particularly limited, the rotation speed of the ceramic block 15 is desirably set in the range of about 2 to about 10 $min^{-1}$.

Successively, sealing material paste is allowed to adhere to the peripheral portion of the rotating ceramic block 15. With respect to the sealing material paste, although not particularly limited, the same adhesive paste as described above may be used.

Next, the sealing material paste layer thus formed is dried at a temperature of about 120° C. to evaporate moisture, thereby forming a sealing material layer 13. The manufacturing process of the honeycomb structural body 10 of the present invention in which the sealing material layer 13 is formed on the peripheral portion of the ceramic block 15 as shown in FIG. 1 is thus completed.

The honeycomb structural body 10 has a structure in which a plurality of porous ceramic members 20 are bound to one another through a sealing material layer 14 to constitute a ceramic block 15, with a sealing material layer 13 being formed on the peripheral portion of the ceramic block 15; alternatively, the honeycomb structural body of the present invention may be constituted by a single porous ceramic member. In this case, no sealing material layer is present, and, for example, the single porous ceramic member itself has a cylindrical shape. In the following description, the honeycomb structural body shown in FIG. 1 is referred to as an aggregate-type honeycomb structural body, and a honeycomb structural body to be explained below is referred to as an integral-type honeycomb structural body.

Figure 23A:
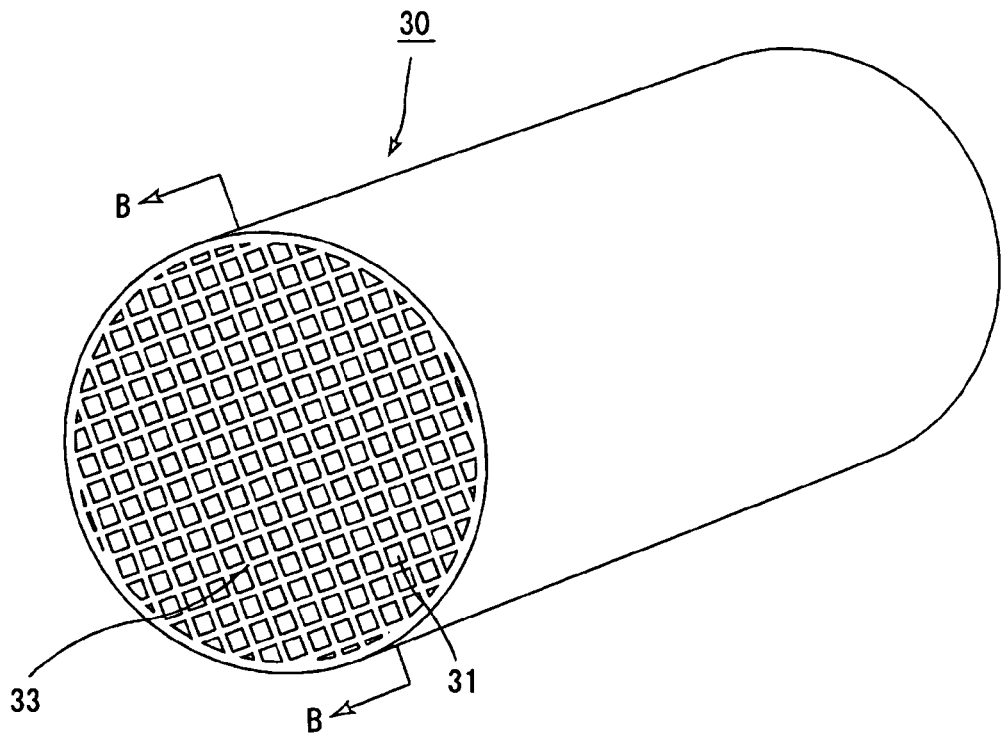
FIG. 23A is a perspective view that schematically shows another example of the honeycomb structural body of the present invention.
Figure 23B:
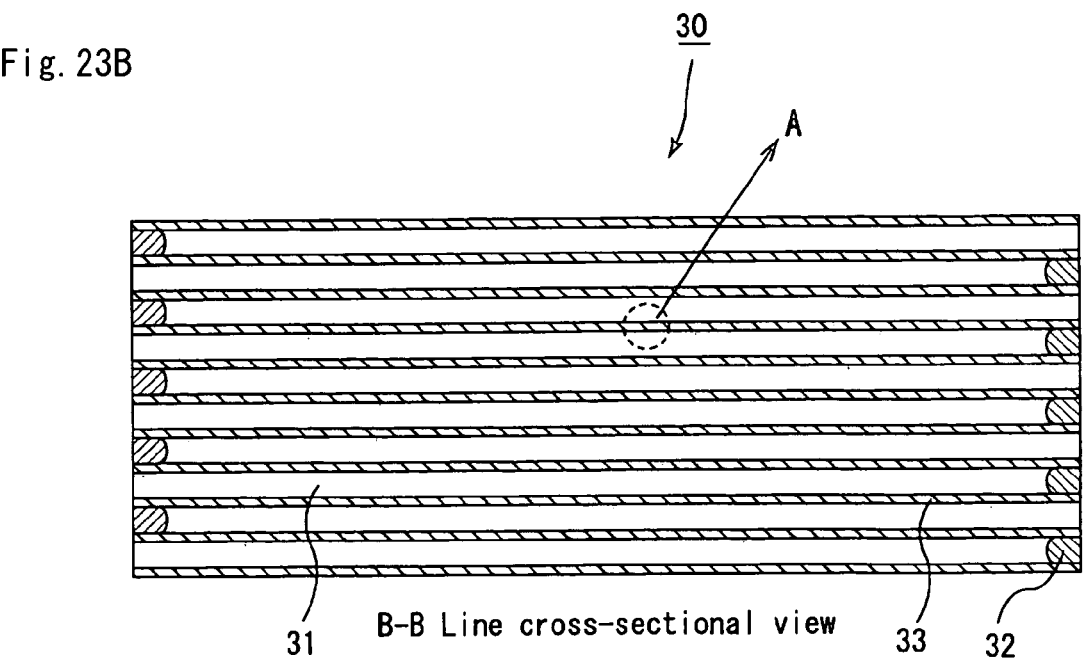
FIG. 23B is a cross-sectional view taken along line B-B of FIG. 23A.

FIG. 23A is a perspective view that schematically shows a specific example of an integral-type honeycomb structural body, and FIG. 23B is a cross-sectional view taken along line B-B of FIG. 23A.

As shown in FIG. 23A, the honeycomb structural body 30 is made of a cylindrical body in which a large number of through holes 31 are placed in parallel with one another in the length direction with a wall portion 33 interposed therebetween, and each of the through holes 31 has its either one of the ends sealed with a plug 32 so that the wall portion 33 as a whole is allowed to function as a filter for collecting particles.

In other words, as shown in FIG. 23B, each of the through holes 31 formed in the honeycomb structural body 30 is sealed with a plug 12 on either one of the ends on the exhaust gas inlet side and outlet side so that exhaust gases that have entered one of the through holes 31 are allowed to flow out of another through hole 31 after always passing through the corresponding wall portion 33 that separates the through holes 31.

The porous body forming the honeycomb structural body 30 is made of the porous body of the above-mentioned specific example.

The honeycomb structural body 30 having such a structure is installed in an exhaust passage of an internal combustion engine, and particulates in exhaust gases discharged from the internal combustion engine are captured by the wall portion 33 upon passing through the honeycomb structural body 30 so that the exhaust gases are purified.

The honeycomb structural body 30 of this type can be also applied to various large-size vehicles, vehicles with diesel engines and the like.

The honeycomb structural body 30, shown in FIGS. 23A and 23B, has a cylindrical shape; however, the honeycomb structural body 30 maybe formed into any desired shape such as an elliptical pillar shape, a rectangular pillar shape or the like.

Moreover, in the same manner as the honeycomb structural body 10 shown in FIG. 18, a sealing material layer may be formed on the periphery of the honeycomb structural body 30. With respect to the above-mentioned sealing material layer, although not particularly limited, for example, the same material as the sealing material layer 13 in the honeycomb structural body 10 shown in FIG. 18 may be used.

A catalyst capable of oxidizing particulates and converting CO, HC, NOx and the like in exhaust gases may be supported in the pores of the honeycomb structural body 30. With respect to the catalyst, the same catalyst as used in the honeycomb structural body 10 shown in FIG. 11 may be used.

In the honeycomb structural body 30, the aperture ratio of the end face on the inlet side and the aperture ratio of the end face on the outlet side are set to the same value; however, in the honeycomb structural body of the present invention, the aperture ratios on the two sides are not necessarily required to have the same value, and, for example, the aperture ratio of the end face on the inlet side may be made greater than the aperture ratio of the end face on the outlet side.

Here, the aperture ratio of the end face refers to a ratio of the area of the group of the opened through holes to the total area of the end face on one of the sides of the honeycomb structural body.

Upon manufacturing the above-mentioned honeycomb structural body, the manufacturing process can be carried out by using the manufacturing method of the porous body of the present invention, and in this case, no process for binding the porous bodies thus manufactured is required so that the honeycomb structural body can be manufactured through a single process.

In other words, after the formed raw formed body has been dried by using a microwave drier or the like, a mouth-sealing process which injects a plug to predetermined through holes is carried out, and this is again subjected to a drying process using a microwave drier or the like, and then subjected to a degreasing process and a firing process so that the honeycomb structural body 30 is manufactured.

Thereafter, a sealing material layer may be formed on the periphery thereof, if necessary.

EXAMPLES

Hereinafter, description will be given of specific examples; however, the present invention is not intended to be limited only by these examples.

(Preparation of Pore Forming Materials A to H for Porous Body)

(1) A pore forming material F for a porous body, made of acrylic particles having an acryl content of 80% by volume and a porosity of 20% by volume, a pore forming material G for a porous body, made of acrylic particles having an acryl content of 40% by volume and a porosity of 60% by volume, and a pore forming material H for a porous body, made of acrylic particles having an acryl content of 30% by volume and a porosity of 70% by volume were respectively prepared.

(2) The pore forming material H for a porous body was charged into an alumina slurry having an average particle diameter of 0.1 μm and a concentration of 15% by weight so that the material was impregnated with alumina under a degassed condition, and after the slurry had been dehydrated, the particles were dried at 80° C. for 3 hours to obtain a pore forming material D for a porous body.

(3) Processes, in which the pore forming material D for a porous body was again charged into an alumina slurry having an average particle diameter of 0.1 µm and a concentration of 15% by weight so that the material was impregnated with alumina under a degassed condition and in which after the slurry had been dehydrated, the particles were dried at 80° C. for 3 hours, were repeated two times (that is, the process (2) was repeated three times); thus, a pore forming material A for a porous body was obtained.

(4) The process (2) was repeated five times to obtain a pore forming material C for a porous body.

(5) Alumina particles, which were a porous structural body having a porosity of 30% and an average particle diameter of 40 µm, were charged into a slurry having an acryl concentration of 15% by weight so that the particles were impregnated with the acrylic component under a degassed condition, and after the slurry had been dehydrated, the particles were dried at 80° C. for 3 hours to obtain a pore forming material E for a porous body.

(6) Processes, in which the pore forming material E for a porous body was again charged into a slurry having an acryl concentration of 15% by weight so that the material was impregnated with the acryl component under a degassed condition and in which after the slurry had been dehydrated, the particles were dried at 80° C. for 3 hours, were repeated two times (that is, the process (5) was repeated three times); thus, a pore forming material B for a porous body was obtained.

The pore forming materials A to H for a porous body were prepared through the processes (1) to (6). The compositions of the pore forming materials A to H for a porous body are shown in the following Table 1. Here, the average particle diameter of each of the pore forming materials A to H for a porous body is set to 40 µm.

TABLE 1

| Pore forming agent for porous body | Porosity (% by volume) | Organic polymer (acryl) (% by volume) | Inorganic particle (alumina) (% by volume) | Volume ratio organic polymer/ inorganic particle |
|---|---|---|---|---|
| A | 20 | 30 | 50 | 0.6 |
| B | 20 | 10 | 70 | 0.14 |
| C | 40 | 30 | 30 | 1.0 |
| D | 60 | 30 | 10 | 3.0 |
| E | 60 | 10 | 30 | 0.33 |
| F | 20 | 80 | — | — |
| G | 60 | 40 | — | — |
| H | 70 | 30 | — | — |
| I | 20 | 30 | Silicon (50% by volume) | 0.6 |

Example 1

(1) Powder of α-type silicon carbide having an average particle diameter of 40 µm (5950 parts by weight) and powder of β-type silicon carbide having an average particle diameter of 0.5 µm (2550 parts by weight) were wet-mixed, and to this were further added and kneaded 600 parts by weight of an organic binder (methylcellulose) and 1800 parts by weight of water to prepare a kneaded matter. Next, to this kneaded matter were further added and kneaded 1450 parts by weight of the pore forming material A for a porous body, 150 parts by weight of a plasticizer (glycerin, made by NOF Corporation) and 330 parts by weight of a lubricant (UNILUBE, made by NOF Corporation), and the resulting kneaded matter was then subjected to extrusion-forming to prepare a raw formed body.

Next, the raw formed body was dried by using a microwave drier, and after this had been subjected to mouth-sealing in which predetermined through holes were filled with paste having the same composition as the raw formed body, the resulting raw formed body was again dried by using a drier, degreased at 400° C. for 3 hours (temperature raising rate: 5° C./min), and fired at 2000° C. in a normal-pressure argon atmosphere for 3 hours to manufacture a porous ceramic member (porous body), as shown in FIG. 2, which was made of a silicon carbide sintered body, and had a size of 34.3 mm×34.3 mm×150 mm, the number of through holes of 31/cm$^2$ and a thickness of the partition wall of 0.3 mm.

(2) Next, a number of the porous ceramic members were bound to one another by using a heat-resistant adhesive paste prepared by adding 20 parts by weight of water to 100 parts by weight of a mixture composed of 17.6% by weight of alumina fibers having a fiber length of 20 µm, 61.0% by weight of silicon carbide particles having an average particle diameter of 0.6 µm, 9.1% by weight of silica sol, 2.3% by weight of carboxy methylcellulose and 10% by weight of ammonium hydrogencarbonate serving as a foaming material through the method that had been explained in the manufacturing method of the honeycomb structural body, and then cut by using a diamond cutter; thus, a cylindrical ceramic block having a diameter of 165 mm, as shown in FIG. 18, was formed.

Next, ceramic fibers made of alumina silicate (shot content: 3%, fiber length: 5 to 100 µm) (23.3% by weight), which served as inorganic fibers, silicon carbide powder having an average particle diameter of 0.3 µm (30.2% by weight), which served as inorganic particles, silica sol (SiO$_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 1.0 mm was formed on the peripheral portion of the ceramic block by using the above-mentioned sealing material paste. Further, this sealing material paste layer was dried at 120° C. so that a cylindrical honeycomb filter, as shown in FIG. 18, was manufactured.

Examples 2 to 5

The same processes as those of Example 1 were carried out except that the blend amounts of the powder of α-type silicon carbide (SiC coarse powder) having an average particle diameter of 40 µm, powder of β-type silicon carbide (SiC fine powder) having an average particle diameter of 0.5 µm and the pore forming material for a porous body, as well as the kind of the pore forming material for a porous body, were changed in a manner as shown in Table 2 to manufacture a honeycomb structural body.

Examples 6

The approximately same processes as Example 1 were carried out except that α-type silicon carbide was used as SiC fine powder serving as the material.

(1) Powder of α-type silicon carbide having an average particle diameter of 40 µm (5950 parts by weight) and powder of α-type silicon carbide having an average particle diameter of 0.5 µm (2550 parts by weight) were wet-mixed, and to this were further added and kneaded 600 parts by weight of an organic binder (methylcellulose) and 1800 parts by weight of water to prepare a kneaded matter. Next, to this kneaded matter were further added and kneaded 1450 parts by weight of the pore forming material A for a porous body, 150 parts by weight of a plasticizer (glycerin, made by NOF Corporation) and 330 parts by weight of a lubricant (UNILUBE, made by NOF Corporation), and the resulting kneaded matter was then subjected to extrusion-forming to fabricate a raw formed body.

Next, the raw formed body was dried by using a microwave drier, and after this had been subjected to mouth-sealing in which predetermined through holes were filled with paste having the same composition as the raw formed body, the resulting raw formed body was again dried by using a drier, degreased at 400° C. for 3 hours (temperature raising rate: 5° C./min), and fired at 2000° C. in a normal-pressure argon atmosphere for 3 hours to manufacture a porous ceramic member (porous body), which was made of a silicon carbide sintered body, and had a size of 34.3 mm×34.3 mm×150 mm, the number of through holes of 31/cm² and a thickness of the partition wall of 0.3 mm.

(2) Next, a number of the porous ceramic members were bound to one another by using a heat-resistant adhesive paste prepared by adding 20 parts by weight of water to 100 parts by weight of a mixture composed of 17.6% by weight of alumina fibers having a fiber length of 20 μm, 61.0% by weight of silicon carbide particles having an average particle diameter of 0.6 μm, 9.1% by weight of silica sol, 2.3% by weight of carboxy methylcellulose and 10% by weight of ammonium hydrogencarbonate serving as a foaming material through the method that had been explained in the manufacturing method of the honeycomb structural body, and then cut by using a diamond cutter; thus, a cylindrical ceramic block having a diameter of 165 mm, as shown in FIG. 18, was formed.

Next, ceramic fibers made of alumina silicate (shot content: 3%, fiber length: 5 to 100 μm) (23.3% by weight), which served as inorganic fibers, silicon carbide powder having an average particle diameter of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 1.0 mm was formed on the peripheral portion of the ceramic block by using the above-mentioned sealing material paste. Further, this sealing material paste layer was dried at 120° C. so that a cylindrical honeycomb filter, as shown in FIG. 18, was manufactured.

Examples 7 to 10

The same processes as those of Example 6 were carried out except that the blend amounts of the powder of α-type silicon carbide (SiC coarse powder) having an average particle diameter of 40 μm, powder of α-type silicon carbide (SiC fine powder) having an average particle diameter of 0.5 μm and the pore forming material for a porous body, as well as the kind of the pore forming material for a porous body, were changed in a manner as shown in Table 2 to manufacture a honeycomb structural body.

Example 11

The same manufacturing method as that for the pore forming material A for a porous body was used except that silicon having a particle diameter of 0.5 μm was adopted as the inorganic particles to manufacture a pore forming material for a porous body. This was defined as a pore forming material I for a porous body (see Table 1). Powder of α-type silicon carbide having an average particle diameter of 40 μm (SiC coarse powder) (5800 parts by weight) and Si powder having an average particle diameter of 4 μm (1200 parts by weight) were wet-mixed, and to this were further added and kneaded methyl cellulose, water, the pore forming material I for a porous body, glycerin and UNILUBE the amounts of which were indicated in Table 2, and the resulting kneaded matter was subjected to extrusion-forming to fabricate a raw formed body.

Thereafter, the raw formed body was subjected to drying and degreasing in the same manner as Example 1, and then subjected to firing at 1450° C. to manufacture a porous ceramic member (porous body); thus, a honeycomb structural body was manufactured.

Comparative Examples 1 to 3

The same processes as those of Example 1 were carried out except that the blend amounts of the powder of α-type silicon carbide (SiC coarse powder) having an average particle diameter of 40 μm, powder of β-type silicon carbide (SiC fine powder) having an average particle diameter of 0.5 μm and the pore forming material for a porous body, as well as the kind of the pore forming material for a porous body, were changed as shown in Table 2 and that the firing temperature was changed to a range from 2000° C. to 2200° C.; thus, a honeycomb structural body was manufactured.

Comparative Examples 4 to 6

The same processes as those of Example 1 were carried out except that the blend amounts of the powder of α-type silicon carbide (SiC coarse powder) having an average particle diameter of 40 μm, powder of α-type silicon carbide (SiC fine powder) having an average particle diameter of 0.5 μm and the pore forming material for a porous body, as well as the kind of the pore forming material for a porous body, were changed as shown in Table 2 and that the firing temperature was changed to a range from 2000° C. to 2200° C.; thus, a honeycomb structural body was manufactured.

The manufacturing conditions of the honeycomb structural bodies according to Examples 1 to 11 and Comparative Examples 1 to 6 are shown in the following Table 2.

TABLE 2

| | α-type SiC (particle diameter: 40 μm) | β(α)-type SiC (particle diameter: 0.5 μm) | Methyl cellulose | Pore forming agent for porous body | | Content of acrylic component | UNILUBE | Glycerin | Water |
| | | | | Kind | Blend amount | | | | |
| --- | --- | --- | --- | --- | --- | --- | --- | --- | --- |
| Example 1 | 5950 | 2550 (βSiC) | 600 | A | 1450 | 190 | 330 | 150 | 1800 |
| Example 2 | 4550 | 1950 (βSiC) | 600 | B | 3940 | 135 | 330 | 150 | 1800 |

TABLE 2-continued

|  | α-type SiC (particle diameter: 40 μm) | β(α)-type SiC (particle diameter: 0.5 μm) | Methyl cellulose | Pore forming agent for porous body | | Content of acrylic component | UNILUBE | Glycerin | Water |
| --- | --- | --- | --- | --- | --- | --- | --- | --- | --- |
|  |  |  |  | Kind | Blend amount |  |  |  |  |
| Example 3 | 4550 | 1950 (βSiC) | 600 | C | 2040 | 410 | 330 | 150 | 1800 |
| Example 4 | 4550 | 1950 (βSiC) | 600 | D | 950 | 410 | 330 | 150 | 1800 |
| Example 5 | 3220 | 1380 (βSiC) | 600 | E | 2600 | 200 | 330 | 150 | 1800 |
| Example 6 | 5950 | 2550 (αSiC) | 600 | A | 1450 | 190 | 330 | 150 | 1800 |
| Example 7 | 4550 | 1950 (αSiC) | 600 | B | 3940 | 135 | 330 | 150 | 1800 |
| Example 8 | 4550 | 1950 (αSiC) | 600 | C | 2040 | 410 | 330 | 150 | 1800 |
| Example 9 | 4550 | 1950 (αSiC) | 600 | D | 950 | 410 | 330 | 150 | 1800 |
| Example 10 | 3220 | 1380 (αSiC) | 600 | E | 2600 | 200 | 330 | 150 | 1800 |
| Example 11 | 5800 | 1200 (Si) | 600 | I | 1450 | 190 | 330 | 150 | 1800 |
| Comparative Example 1 | 5950 | 2550 (βSiC) | 600 | F | 500 | 500 | 330 | 150 | 1800 |
| Comparative Example 2 | 4550 | 1950 (βSiC) | 600 | G | 550 | 550 | 330 | 150 | 1800 |
| Comparative Example 3 | 5950 | 2550 (βSiC) | 600 | H | 190 | 190 | 330 | 150 | 1800 |
| Comparative Example 4 | 5950 | 2550 (αSiC) | 600 | F | 500 | 500 | 330 | 150 | 1800 |
| Comparative Example 5 | 4550 | 1950 (αSiC) | 600 | G | 550 | 550 | 330 | 150 | 1800 |
| Comparative Example 6 | 5950 | 2550 (αSiC) | 600 | H | 190 | 190 | 330 | 150 | 1800 |

Note)
The blend amount herein is indicated by parts by weight, and the particle diameter of Si used in Example 11 is 4 μm.

With respect to the honeycomb structural bodies according to Examples 1 to 11 and Comparative Examples 1 to 6, the shape of the pore forming material for a porous body after the extrusion-forming process was observed through an LV-SEM system. As a result, no deformation in the pore forming material for a porous body was observed with respect to the formed bodies according to Examples 1 to 11 and Comparative Examples 1, 2, 4 and 5. In contrast, in the formed bodies according to Comparative Examples 3 and 6, the pore forming material for a porous body was squashed.

With respect to the honeycomb structural bodies according to Examples 1 to 11 and Comparative Examples 1 to 6, upon completion of the degreasing process, each of the formed bodies was visually observed for any cracks. As indicated by the results of the tests shown in Table 3, no cracks generated in the formed bodies in Examples 1 to 11 and Comparative Examples 3 and 6. In contrast, cracks generated in the formed bodies in Comparative Examples 1, 2, 4 and 5.

Moreover, each of the formed bodies of Examples 1 to 11 and Comparative Examples 1 to 6 was cut into a cubic shape having 1 cm in each side as a sample for honeycomb, and after having been made into powder, the sample was put into a calorimeter, and heated to a range of 20° C. to 400° C. at a temperature raising rate of 5° C./min so that the total calorific value during the degreasing process was accumulated and summed. The results are shown in Table 3.

Moreover, with respect to each of the honeycomb structural bodies according to Examples 1 to 11 and Comparative Examples 3 and 6, the porosity was measured by using a porosimeter. Table 3 shows the results.

TABLE 3

|  | Occurrence of cracking at degreasing | Porosity after firing (% by volume) | Total calorific value at degreasing (cal/cm³) |
| --- | --- | --- | --- |
| Example 1 | No | 50 | 58.7 |
| Example 2 | No | 59 | 53.8 |
| Example 3 | No | 60 | 81.7 |
| Example 4 | No | 61 | 91.9 |
| Example 5 | No | 70 | 79 |
| Example 6 | No | 50 | 58.7 |
| Example 7 | No | 60 | 53.8 |
| Example 8 | No | 59 | 81.7 |
| Example 9 | No | 63 | 91.9 |
| Example 10 | No | 68 | 79 |
| Example 11 | No | 50 | 69.1 |
| Comparative Example 1 | Yes | — | 105 |
| Comparative Example 2 | Yes | — | 114 |
| Comparative Example 3 | No | 44 | 66.1 |
| Comparative Example 4 | Yes | — | 105 |
| Comparative Example 5 | Yes | — | 114 |
| Comparative Example 6 | No | 43 | 66.1 |

As clearly indicated by the results, since the manufacturing process was carried out by using the pore forming material for a porous body of the present invention in each of Examples 1 to 11, the honeycomb structural body having a high porosity exceeding 50% by volume was manufactured without generating cracks.

Moreover, in Examples 1 to 10, even when the firing temperature was lowered not to 2200° C., but to 2000° C., it became possible to sufficiently carry out the firing process.

In contrast, with respect to Comparative Examples 1, 2, 4 and 5, cracks generated in the formed body upon completion of the degreasing process. This was presumably because the amount of organic polymers (amount of acrylic components) in the pore forming material for a porous body used in this case was too high to cause a high temperature in the formed body due to an abrupt burning of the organic polymers during the degreasing process, resulting in the generation of cracks (in each of Comparative Examples 1, 2, 4 and 5, the numeric values of the calorimeter were higher than those of the examples). Moreover, in Comparative Examples 3 and 6, since a pore forming material for a porous body having a high porosity made of only organic polymers (acrylic resin) was used, the pore forming material for a porous body was squashed upon extrusion-forming, a preliminarily set porosity of 50% or more was not attained to have a porosity of 44% in the resulting honeycomb structural body, failing to maintain a sufficient porosity.

The invention claimed is:

1. A pore forming material for a porous body, comprising:
    an organic polymer component which thermally decomposes during a sintering of a green porous body; and
    an inorganic component,
    wherein the organic polymer component comprises a plurality of organic polymer particles, the inorganic component comprises a plurality of inorganic particles, the organic polymer particles and the inorganic particles comprise a plurality of aggregated bodies of the organic polymer particles and the inorganic particles, and each of the aggregated bodies has a volume ratio of the organic polymer component to the inorganic component in a range of about 0.1 to about 250, and the plurality of aggregated bodies formed by filtering and degassing a mixture comprising the organic polymer particles and the inorganic particles such that each of the aggregated bodies has an average particle diameter in the range of about 20 to about 60 μm.

2. The pore forming material for a porous body according to claim 1, wherein the plurality of inorganic particles includes a plurality of inorganic micro-balloons.

3. The pore forming material for a porous body according to claim 2, wherein the inorganic particles adhere to a periphery of the organic polymer particles being aggregated.

4. The pore forming material for a porous body according to claim 2, wherein the organic polymer particles adhere to a periphery of the inorganic particles being aggregated.

5. The pore forming material for a porous body according to claim 1, wherein the plurality of organic polymer particles includes a plurality of organic micro-balloons.

6. The pore forming material for a porous body according to claim 5, wherein the organic polymer particles adhere to a periphery of the inorganic particles being aggregated.

7. The pore forming material for a porous body according to claim 5, wherein the inorganic particles adhere to a periphery of the organic polymer particles being aggregated.

8. The pore forming material for a porous body according to claim 1, wherein the inorganic particles function as a sintering aid for the porous body.

9. The pore forming material for a porous body according to claim 1, wherein the aggregated bodies have a porosity in the range of about 10% to about 70% by volume, respectively.

10. The pore forming material for a porous body according to claim 1, wherein the volume ratio of the organic polymer component to the inorganic component is in the range of about 0.1 to about 10.

11. The pore forming material for a porous body according to claim 1, wherein each of the aggregated bodies have a spherical shape.

12. The pore forming material for a porous body according to claim 1, wherein the inorganic component comprises at least one ceramics selected from the group consisting of nitride ceramics, carbide ceramics and oxide ceramics.

13. The pore forming material for a porous body according to claim 12, wherein the inorganic component comprises oxide ceramics.

14. The pore forming material for a porous body according to claim 1, wherein the inorganic component comprises at least one metal selected from the group consisting of Si, Fe and Al.

15. The pore forming material for a porous body according to claim 1, wherein the inorganic component comprises a metal compound.

16. The pore forming material for a porous body according to claim 1, wherein the organic polymer component comprises a polymer of mixed monomer compositions comprising a hydrophilic monomer, a multifunctional monomer and other monomers.

17. The pore forming material for a porous body according to claim 1, wherein the plurality of inorganic particles includes a plurality of inorganic micro-balloons and the plurality of organic polymer particles includes a plurality of organic micro-balloons.

18. The pore forming material for a porous body according to claim 1, wherein the inorganic particles adhere to a periphery of the organic polymer particles being aggregated.

19. The pore forming material for a porous body according to claim 1, wherein the organic polymer particles adhere to a periphery of the inorganic particles being aggregated.

* * * * *